United States Patent
Lu

(10) Patent No.: US 8,451,752 B2
(45) Date of Patent: May 28, 2013

(54) SEAMLESS HANDOFF SCHEME FOR MULTI-RADIO WIRELESS MESH NETWORK

(75) Inventor: Wenchen Lu, Saratoga, CA (US)

(73) Assignee: Arrowspan, Inc., Santa Clara, CA (US)

( * ) Notice: Subject to any disclaimer, the term of this patent is extended or adjusted under 35 U.S.C. 154(b) by 270 days.

(21) Appl. No.: 12/820,988

(22) Filed: Jun. 22, 2010

(65) Prior Publication Data

US 2010/0260146 A1 Oct. 14, 2010

Related U.S. Application Data

(63) Continuation-in-part of application No. 12/470,376, filed on May 21, 2009, now Pat. No. 8,121,053, which is a continuation-in-part of application No. 12/124,961, filed on May 21, 2008, now Pat. No. 7,912,063, and a continuation-in-part of application No. 12/124,965, filed on May 21, 2008, now Pat. No. 7,773,542.

(60) Provisional application No. 61/219,699, filed on Jun. 23, 2009, provisional application No. 61/055,107, filed on May 21, 2008, provisional application No. 60/939,314, filed on May 21, 2007.

(51) Int. Cl.
*H04L 12/28* (2006.01)
*H04L 12/56* (2006.01)
*H04W 4/00* (2009.01)

(52) U.S. Cl.
USPC ........... 370/254; 370/331; 370/338; 370/392; 455/432

(58) Field of Classification Search
USPC .......... 370/254–356, 392–401; 455/432–436, 455/442–562; 709/221–229
See application file for complete search history.

(56) References Cited

U.S. PATENT DOCUMENTS

| | | | |
|---|---|---|---|
| 7,269,418 B2 | 9/2007 | Kayashima et al. | |
| 7,343,160 B2 * | 3/2008 | Morton | 455/444 |
| 7,391,754 B2 * | 6/2008 | Bae et al. | 370/331 |
| 7,460,489 B2 | 12/2008 | Sugiarto et al. | |
| 7,477,620 B2 * | 1/2009 | Kim et al. | 370/328 |
| 7,480,307 B2 * | 1/2009 | Chaskar et al. | 370/401 |
| 7,489,932 B2 * | 2/2009 | Chari et al. | 455/447 |
| 7,496,078 B2 | 2/2009 | Rahman | |
| 7,561,548 B2 * | 7/2009 | Xu | 370/331 |
| 7,711,004 B2 | 5/2010 | Xu | |
| 7,826,426 B1 * | 11/2010 | Bharghavan et al. | 370/331 |
| 7,860,061 B2 * | 12/2010 | Abrol et al. | 370/331 |
| 7,885,243 B2 | 2/2011 | da Costa et al. | |
| 7,903,611 B2 * | 3/2011 | Wu et al. | 370/331 |
| 7,969,945 B2 * | 6/2011 | Navali et al. | 370/331 |

(Continued)

*Primary Examiner* — Man Phan
(74) *Attorney, Agent, or Firm* — Blakely Sokoloff Taylor & Zafman LLP

(57) ABSTRACT

A mobile device communicates with a first mesh access point (AP) via a first radio frequency (RF) interface of the mobile device over a first wireless connection, where the first mesh AP is one of mesh APs of a first mesh cell of the wireless mesh network. It is detected that signal quality of the first wireless connection drops below a predetermined threshold as the mobile device moves from the first mesh cell towards a second mesh cell. In response to the detection, it is established via a second RF interface of the mobile device a second wireless connection with a second mesh AP of a second mesh cell of the wireless mesh network, while concurrently maintaining the first wireless connection with the first mesh AP via the first RF interface.

18 Claims, 22 Drawing Sheets

U.S. PATENT DOCUMENTS

| | | |
|---|---|---|
| 8,078,175 B2 * | 12/2011 | Salkintzis et al. ............ 455/436 |
| 2005/0068970 A1 | 3/2005 | Srikrishna et al. |
| 2005/0105491 A1 * | 5/2005 | Chaskar et al. ............... 370/331 |
| 2006/0083199 A1 * | 4/2006 | Yang ............................. 370/331 |
| 2006/0187883 A1 * | 8/2006 | Abrol et al. ................... 370/331 |
| 2006/0195590 A1 | 8/2006 | Tsubota |
| 2006/0200543 A1 * | 9/2006 | Kong et al. ................... 709/223 |
| 2006/0242457 A1 | 10/2006 | Roy et al. |
| 2007/0091871 A1 | 4/2007 | Taha et al. |
| 2007/0155376 A1 * | 7/2007 | Payyappilly et al. ...... 455/422.1 |
| 2007/0177547 A1 * | 8/2007 | Horn et al. .................... 370/331 |
| 2007/0189249 A1 | 8/2007 | Gurevich et al. |
| 2007/0242695 A1 | 10/2007 | Xu |
| 2007/0254661 A1 * | 11/2007 | Chowdhury et al. ......... 455/436 |
| 2008/0112363 A1 | 5/2008 | Rahman et al. |
| 2008/0205420 A1 | 8/2008 | Srikrishna et al. |
| 2009/0285124 A1 * | 11/2009 | Aguirre et al. ................ 370/255 |
| 2010/0172265 A1 | 7/2010 | Wheeler et al. |

* cited by examiner

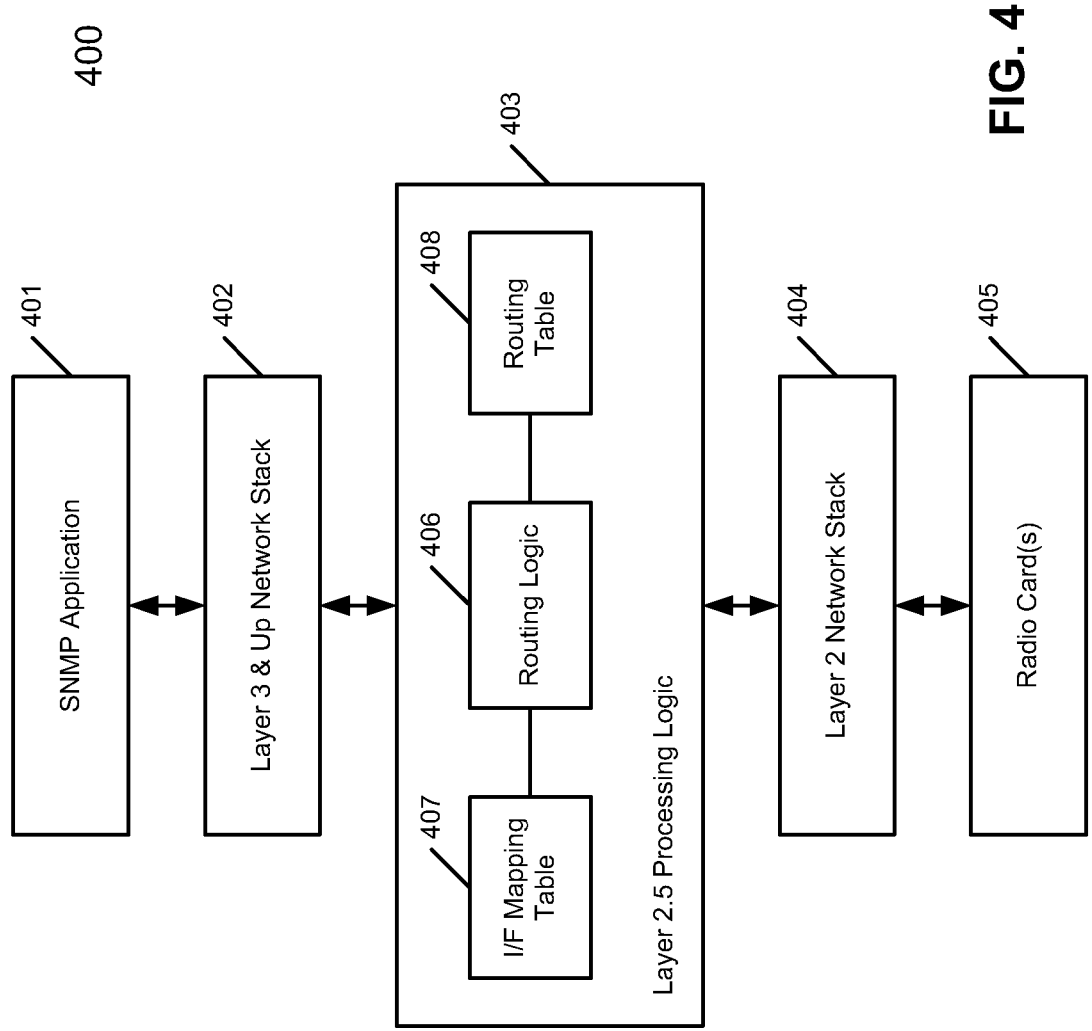

| 600 | |
|---|---|
| MAC Address (601) | I/F ID (602) |
| | |
| | |
| ... | ... |
| | |

FIG. 6

| 500 | | |
|---|---|---|
| I/F ID (501) | AP Source MAC Address (502) | AP Destination MAC Address (503) |
| 1 | | |
| 2 | | |
| ... | ... | ... |
| N | | |

FIG. 5

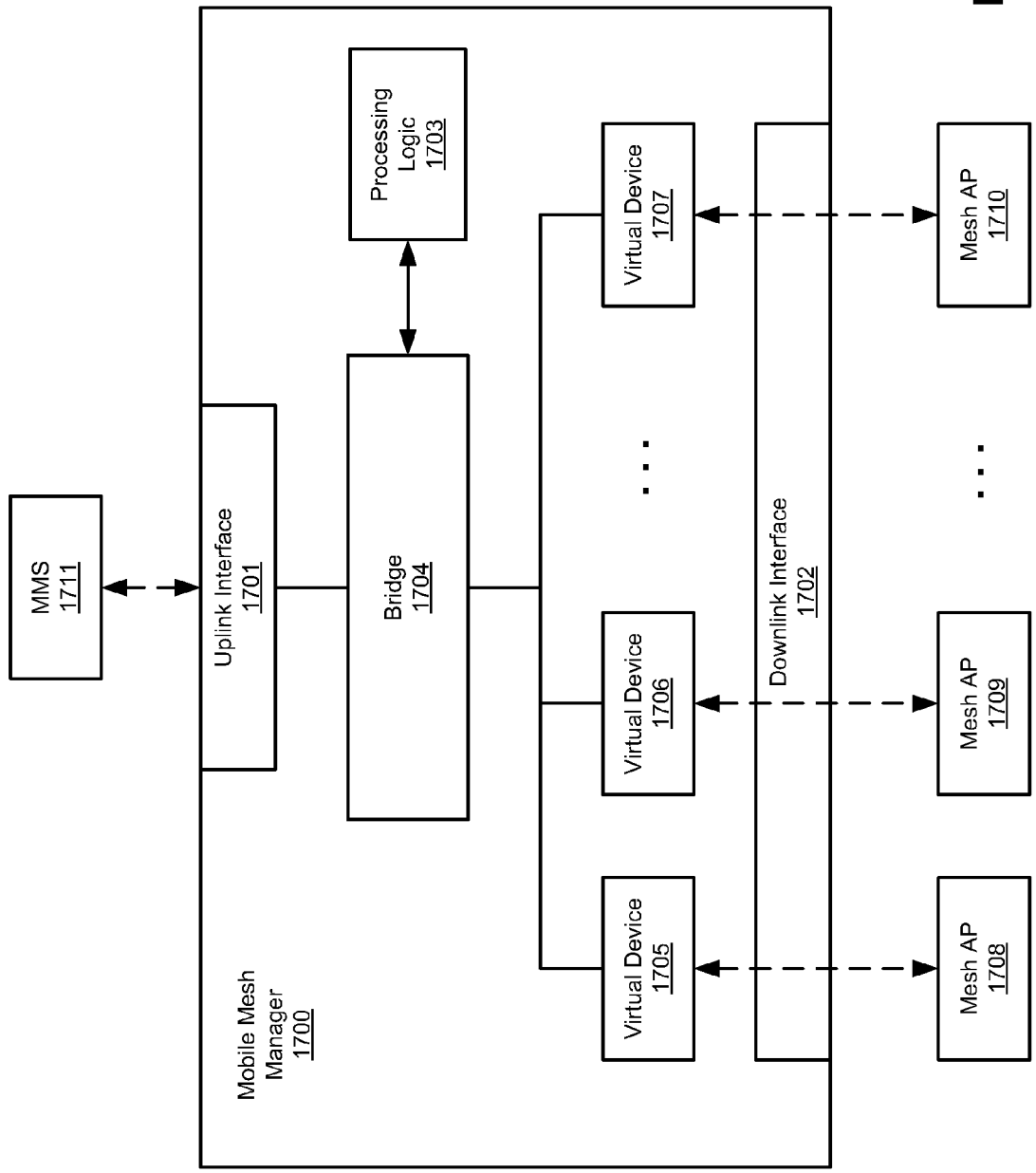

SEAMLESS HANDOFF SCHEME FOR MULTI-RADIO WIRELESS MESH NETWORK

RELATED APPLICATION

This application claims the priority of U.S. Provisional Application No. 61/219,699, filed Jun. 23, 2009. This application is also a continuation-in-part (CIP) of U.S. application Ser. No. 12/470,376, now U.S. Pat. No. 8,121,053, filed May 21, 2009, which claims the priority of U.S. Provisional Patent Application No. 61/055,107, filed May 21, 2008. The U.S. patent application Ser. No. 12/470,376 is also a CIP of U.S. application Ser. No. 12/124,961, now U.S. Pat. No. 7,912,063 and U.S. application Ser. No. 12/124,965, now U.S. Pat. No. 7,773,542, both filed May 21, 2008, which claim the priority from U.S. Provisional Patent Application No. 60/939,314, filed May 21, 2007. The disclosure of the above-dentified applications is incorporated by reference herein in its entirety.

FIELD OF THE INVENTION

The present invention relates generally to wireless networks. More particularly, this invention relates to a handoff scheme for multi-radio wireless mesh networks.

BACKGROUND

Wireless mesh networks are gaining popularity because wireless infrastructures are typically easier and less expensive to deploy than wired networks. The wireless mesh networks typically include wired gateways that are wirelessly connected to wireless nodes, or wireless connected directly to client devices. Many wireless nodes can collectively provide a wireless mesh, in which client devices can associate with any of the wireless nodes.

Typically, the wireless nodes are implemented as wireless access points (APs). A typical wireless AP includes a local link interface to communicate with local client devices and a downlink and uplink interfaces to communicate with other APs. Conventional APs utilize the same communication frequency when communicating with other APs. As a result, there may be an interference between an uplink and a downlink communications and may have impact on the signal quality. In addition, communications between the wireless APs typically are in a form of plain text which may be vulnerable to be attacked.

IEEE 802.11 wireless application has long been a problem of delay and latency of its wireless roaming hand-off process. Because WiFi connection of 802.11 physical layer association process and network layer establishment involving IP re-establishment need a long time to complete, an application will get disconnected. This long WiFi hand-over time prevents implementation of real-time applications such as mobile video surveillance and mobile voice conversation, etc. This drawback hinders the development of mobile applications using the most cost effective 802.11 technology.

Traditional mobile virtual private network (VPN) solutions only solve user network equipment IP address remaining the same during roaming to maintain an application alive. However, obtaining a local IP address and switching from one access point (AP) to another AP still have the problem of taking a long time to perform. Thus, VPN is not suitable for true WiFi mobile applications.

SUMMARY OF THE DESCRIPTION

Techniques for providing multi-radio wireless mesh network solutions are described herein. According to one embodiment, A mobile device communicates with a first mesh access point (AP) via a first radio frequency (RF) interface of the mobile device over a first wireless connection, where the first mesh AP is one of mesh APs of a first mesh cell of the wireless mesh network. It is detected that signal quality of the first wireless connection drops below a predetermined threshold as the mobile device moves from the first mesh cell towards a second mesh cell. In response to the detection, it is established via a second RF interface of the mobile device a second wireless connection with a second mesh AP of a second mesh cell of the wireless mesh network, while concurrently maintaining the first wireless connection with the first mesh AP via the first RF interface. As a result, the mobile device maintains communications with the wireless mesh network via at least one of the first and second wireless connections while roaming from the first mesh cell to the second mesh cell.

According to another embodiment, a first packet originated from a mobile device is received via a downlink interface of the mesh AP, where first packet is destined to a destination node of an external network, which is communicatively coupled to the wireless mesh network via a mobile mesh server (MMS). The first packet is received via layer-2 routing from the mobile device based on a media access control (MAC) address of the mobile device and a MAC address of the mesh AP. The first packet is examined to determine whether the packet contains a predetermined virtual local area network (VLAN) ID. If so, it is generated within the mesh AP a second packet by encapsulating the first packet as a payload of the second packet if the first packet contains the predetermined VLAN ID, where the second packet includes an IP address of the mesh AP as a source IP address and an IP address of the MMS as a destination IP address. Thereafter, the second packet is transmitted from the mesh AP to the MMS over a layer-3 tunnel that has been established based on the IP address of the mesh AP and the IP address of the MMS, in order to access the destination node of the external network. When the MMS receives the second packet, the MMS is configured to strip off a layer-3 header from the second packet to reveal the first packet as part of the payload and to route the first packet to the external network.

Other features of the present invention will be apparent from the accompanying drawings and from the detailed which follows.

BRIEF DESCRIPTION OF THE DRAWINGS

The present invention is illustrated by way of example and not limitation in the figures of the accompanying drawings in which like references indicate similar elements.

FIG. 4 is a block diagram illustrating an example of software architecture of a wireless mesh access point according to one embodiment of the invention.

FIG. 5 is a block diagram illustrating a data structure representing a routing table according to one embodiment of the invention.

FIG. 6 is a block diagram illustrating a data structure representing an interface mapping table according to one embodiment of the invention.

FIG. 17 is a block diagram illustrating software architecture of a mobile mesh manager according to one embodiment of the invention.

DETAILED DESCRIPTION

Figure 1:
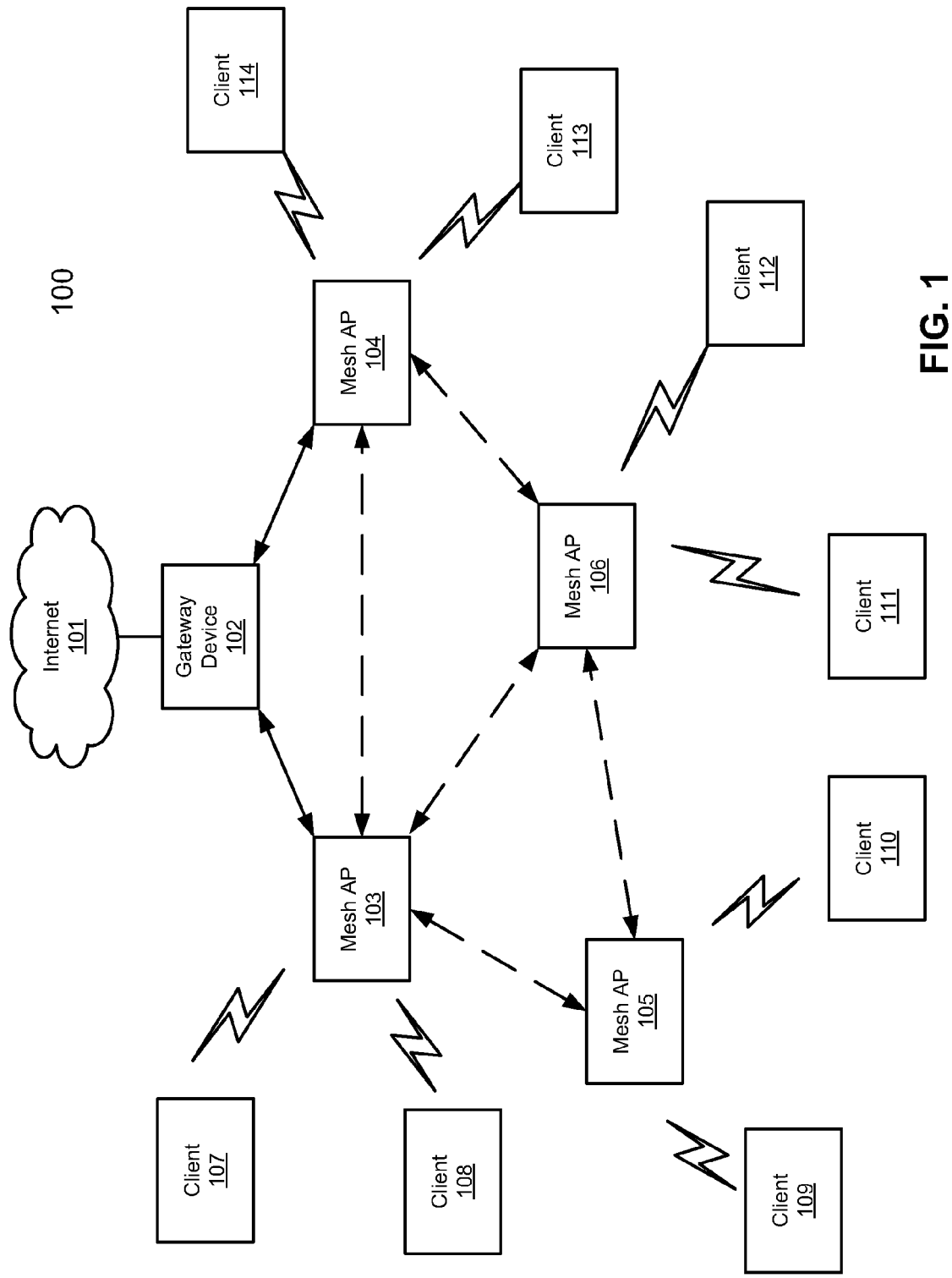
FIG. 1 is a block diagram illustrating an example of a wireless mesh network configuration which may be used with an embodiment of the invention.

Techniques for providing multi-radio wireless mesh network solutions are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According certain embodiments of the invention, multiple wireless path design is provided for both backhaul (e.g., also referred to as a mesh link among multiple mesh APs) and user traffic (e.g., also referred to as a client link between an AP and a local end-user client) to eliminate adjacent AP signal interference degradation. There has been provided a best network throughput via layer-2 fast switching and bridging from AP (access point) to AP to support real time video, voice, and data applications. It is fully compatible with existing access servers, routers, and gateways since existing drivers and layer-3 applications are not modified. It is transparent to layer 3 and up protocols and thus, it is fully compatible with existing network infrastructure or equipments. An AP is directly connected to existing routers, gateways, or AP through, for example, 10/100 Ethernet. The management and security software architecture is configured to support Web based browser and SNMP (simple network management protocol). It also supports WEP (wireless encryption protocol) encryption security across wireless mesh network. Multiple APs can be coupled to each other based on a mesh ID assigned by a user or administrator.

In one embodiment, each node includes multiple wireless interfaces or antennas. For example, a node in a mesh network may include a local AP antenna that operates as an AP for local clients (e.g., end-user clients such as laptop computers, etc.) In addition, the node may further include multiple mesh link AP antennas, one for uplink and one for down link. An uplink interface is configured to communicate with a downlink interface of another node and likewise, a downlink interface of a node is configured to communicate with an uplink interface of another node. Separate channels (e.g., different communication frequencies) are used for uplink and downlink. As result, air link interference can be greatly reduced.

According to another embodiment of the invention, software architecture utilizes existing wireless architecture such as IEEE 802.11 WiFi client and AP drivers, to achieve WIFi mesh network design. As a result, the system can maintain most of the features of WiFi client driver and WiFi access point driver so that it is fully compatible with certain third party products while creating a mesh WiFi network. For example, the software architecture includes an additional layer (also referred to herein as layer 2.5) between ordinary layer-2 and layer 3 of a network stack to process data received from layer-2 driver before delivering the data to ordinary layer 3 or alternatively, sending the data back down to layer 2 without sending the data to layer 3, dependent upon specific system design. As a result, third party layers 2 and 3 can be utilized without having to modify a specific driver of a third party vendor.

Further, according to a further embodiment, tunneling is designed to transfer data packets from one node to another node going through standard WiFi client and AP design. For example, each node includes a common AP interface to communicate with multiple clients, where each client communicates with the node via a tunneling technique using the common AP interface. Thus, when a node receive a data packet from a client via normal WiFi client/AP communication protocol, the specific data associated with the sender is encrypted using a variety of data encryption techniques and tunneled within the standard WiFi packets. The receiving node then may decrypt the data packets to reveal who is the actual sender. Further, each node that communicates with the AP interface of a particular node may appear as a virtual node in the particular node.

According to a further embodiment, each node in a WiFi mesh network includes a routing module (also referring to as a bridging module) and a database. The database is used to store information of other nodes which may be collected (e.g., learned) during communications with other nodes including, for example, signal strength, MAC (media access control) addresses, link status, and mesh links (e.g., parent and/or child nodes). The information stored in the database may be used to determine the best route to route the data packets. For example, each node may be assigned with a mesh ID by a user or an administrator. Under certain circumstances, only those nodes having the identical mesh ID may be grouped in a mesh network. Further, the signal strength information may be used to identify the adjacent nodes in the mesh network to determine the shortest route to an AP.

According another embodiment, if a first node has too many hop counts to a master node, and a second node has less hop counts, the first and second nodes may communicate with each other to "relocate" certain routes from the first node to the second node for the load balancing purposes.

In one embodiment, each AP includes a dedicated wireless interface or antenna to actively monitor operations such as routing information of neighboring APs in order to determine an optimum route for its associated uplink path, downlink path, and local link path. That is, each AP includes at least four wireless interfaces or antennas: 1) uplink interface; 2) downlink interface; 3) lock link interface; and 4) monitoring interface. The monitoring logic within an AP actively monitors via the corresponding dedicated wireless interface all mesh links associated with the corresponding AP. If a better routing path is available, the traffic may be rerouted to the better routing path for the corresponding uplink, downlink, and/or local link of the respective AP to optimize the mesh network quality.

According to some embodiments, a mobile device at any time is communicatively coupled to at least one AP of a mesh network. During the handoff, the mobile device may concurrently coupled to at least two APs, before one of them is disconnected. As a result, the mobile device is always connected to at least one AP such that there would be no loss during the handoff. The design concept is based on two radios approach. A special algorithm design to make two radios to switch from cell to cell at different pace so there is always either one radio or two radios connecting to AP(s). There is no time that both radios do not connect. So the network is always connected in a sense. A set of special tunneling design and network architecture design on layer 2 and layer 3 are implemented to guarantee this special design work well in both data link (layer 2) and network (layer 3) layers. This scheme is capable of supporting seamlessly roaming speed of less than 10 seconds stay in an AP cell. With more distance support of AP to AP, this approach can support vehicle speed of even at 500 km/h with up to 25 Mbps seamlessly WiFi connection speed.

In one embodiment, at the beginning, the mobile device is connected to two best signal APs. Thus, two links will be on at the same time. Once one link signal level result based on a predetermined algorithm analysis is not preferred which is either below certain threshold level or to not meet certain specifically designed criteria, then that link will be disconnected. The operating environment is re-evaluated to select another best AP (except the AP connected by the other link), if available and with better signal strength and quality, and then connect to that AP.

In one embodiment, during the handoff, the network path through two links are well managed to not cause network looping, to command network to do fast switching of those two links, and to guarantee an end user device behind mobile device does not feel the two mobile links are actually up and down frequently, which are all done by detail driver and application software design to implement packet traffic direction control, network path updating, and layer2/layer3 tunneling. For layer-2 tunneling implementation, there is another device called mobile server to act as the other end of tunneling for each mobile device. For layer-2 & layer-3 tunneling implementation, this layer-2 mobile server is implemented as part of a mesh manager, then this mesh manager will implement layer-3 tunneling to a remote site layer-3 mobile server. It is a two-layer implementation.

Secured Communications Protocols for Wireless Mesh Network

FIG. 1 is a block diagram illustrating an example of a wireless mesh network configuration which may be used with an embodiment of the invention. Referring to FIG. 1, wireless mesh network configuration 100 includes, but is not limited to, multiple mesh APs 103-106 communicatively coupled to each other as depicted via dash communication links. Some of the APs such as APs 103-104 may be coupled via a wired network to a gateway device 102 which allows traffic from the wireless mesh network to reach an external network or another network 101 such as wide area network (WAN), which may be the Internet.

Each of the APs 103-106 includes a local AP link to communicate with local clients (e.g., end-user clients) 107-114. Each of the clients 107-114 may be associated with any of the APs 103-106, which may be statically assigned by an administrator or alternatively, via roaming dynamically. In this example, clients 107-108 are associated with AP 103; clients 109-110 are associated with AP 105, clients 111-112 are associated with AP 106; and clients 113-114 are associated with AP 104 respectively.

According to one embodiment, each of the APs 103-106 includes an uplink interface or antenna and a downlink interface or antenna. An uplink interface of one AP is used to communicate with a downlink interface of another AP. Similarly, a downlink interface of one AP is used to communicate with an uplink interface of another AP. For example, an up link interface of AP 105 may be used to communicate with a downlink interface of AP 103. Likewise, a downlink interface of AP 105 may be used to communicate with an uplink interface of AP 106.

According to one embodiment, communication frequencies for the uplink interface and downlink interface of a particular AP may be different which may be selected or configured by an administrator statically or dynamically (e.g., auto discovery or via frequency hopping). In this way, each backhaul communication link between two APs may have different frequency which greatly reduces the interference.

Furthermore, according to another embodiment, data between two APs may be securely communicated via a tunneling technique. For example, when an AP receives a packet from a local end-user client, the AP may tunnel the packet by encrypting at least the source and destination MAC (media access control) addresses as well as the payload of the packet into a payload of a new packet. The new packet is then package with a new set of source and destination MAC addresses, where the new source MAC address is associated with the AP itself while the destination MAC address is associated with another AP (e.g., next hop). As a result, the new packet can be layer-2 routed to the next AP identified by the new destination MAC address.

When the next hop AP receives the tunneled packet, the next hop AP strips out or removes the source and destination MAC addresses and decrypt the payload of the tunneled packet to reveal the original packet from the end user client. The next hop AP then examines the original destination MAC address to determine whether the destination end-user client is a local end-user client of the next hop AP. If the destination end-user client is a local end-user client, the original packet is transmitted to the identified local end-user client. If the destination end-user client is not a local end-user client, the AP then repackages or re-tunnels the original packet and sends the tunneled packet to another next hop AP, and so on.

In addition, according to one embodiment, at least one AP includes a dedicated wireless interface or antenna to actively monitor operations such as routing information of neighboring APs in order to determine an optimum route for its associated uplink path, downlink path, and local link path. That is, at least one AP includes at least four wireless interfaces or antennas: 1) uplink interface; 2) downlink interface; 3) lock link interface; and 4) monitoring interface. The monitoring logic within an AP actively monitors via the corresponding dedicated wireless interface all mesh links associated with the corresponding AP. If a better routing path is available, the traffic may be rerouted to the better routing path for the corresponding uplink, downlink, and/or local link of the respective AP to optimize the mesh network quality. Other configurations may exist.

Figure 2:
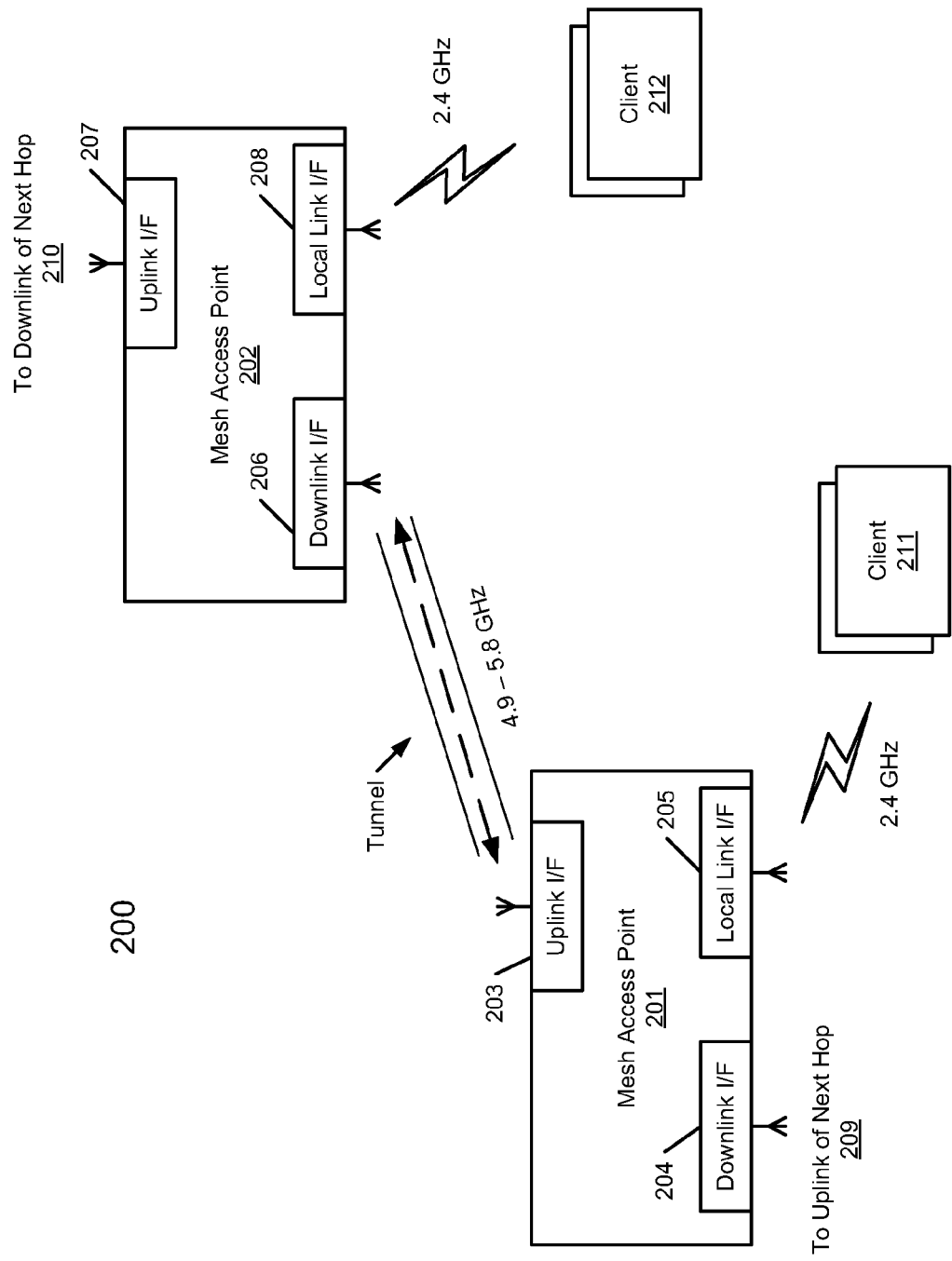
FIG. 2 is a block diagram illustrating inter-mesh AP communications according to one embodiment of the invention.

FIG. 2 is a block diagram illustrating inter-mesh AP communications according to one embodiment of the invention. For example, APs 201-202 may be implemented as any of APs 103-106 of FIG. 1. Referring to FIG. 2, AP 201 includes an uplink interface 203 and a downlink interface 204, as well as a local link interface 205 for local clients 211. Similarly, AP 202 includes an uplink interface 207, a downlink interface 206, and a local link interface 208 for local clients 212. Downlink interface 204 of AP 201 is used to communicate with an uplink interface of a next hop 209. Uplink interface 207 of AP 202 is used to communicate with a downlink interface of a next hop 210. Uplink interface 203 is used to communicate with a downlink interface 206 of AP 202.

Typically, a local link interface communicates with a local client using a communication frequency of approximately 2.4 GHz using a standard wireless protocol such as, for example, IEEE 802.11b/g protocol. The communication frequency of the backhaul or mesh link communications is ranging approximately from 4.9 to 5.8 GHz using a standard wireless protocol such as, for example, IEEE 802.11a protocol. However, according to one embodiment, each mesh link may operate at a different communication frequency. For example, with respect to a particular AP, the communication frequency of a downlink interface is different than the communication frequency of an uplink interface. As a result, air interference is greatly reduced.

Furthermore, the communications between downlink interface 206 of AP 202 and uplink interface 203 of AP 201 are securely performed using a tunneling protocol and/or a variety of encryption techniques. For example, when AP 201 receives a packet form a local client 211, the AP 201 encrypts almost the entire packet to generate a new packet having a source MAC address of AP 201 and a destination MAC address of AP 202. The new packet is then routed from AP 201 to AP 202 via uplink interface 203 of AP 201 and downlink interface 206 of AP 202.

When AP 202 receives the new packet, AP 202 strips out the header (e.g., source and destination MAC addresses) and decrypts the payload of the new packet to reveal the original packet originated from end user client 211. Based on the destination MAC address of the revealed original packet, AP 202 determines whether the original packet is destined to a local end-user client such as client 212. If the original packet is destined to a local end-user client, AP 202 then routes the original packet to the local client via local link interface 208. However, if the original packet is not destined to a local end-user client, AP 202 may repackage or re-tunnel the original packet with a source MAC address of AP 202 and a destination MAC address of a next hop, which may be an AP communicatively coupled via uplink interface 207 or another AP communicatively coupled via downlink interface 206.

Figure 3:
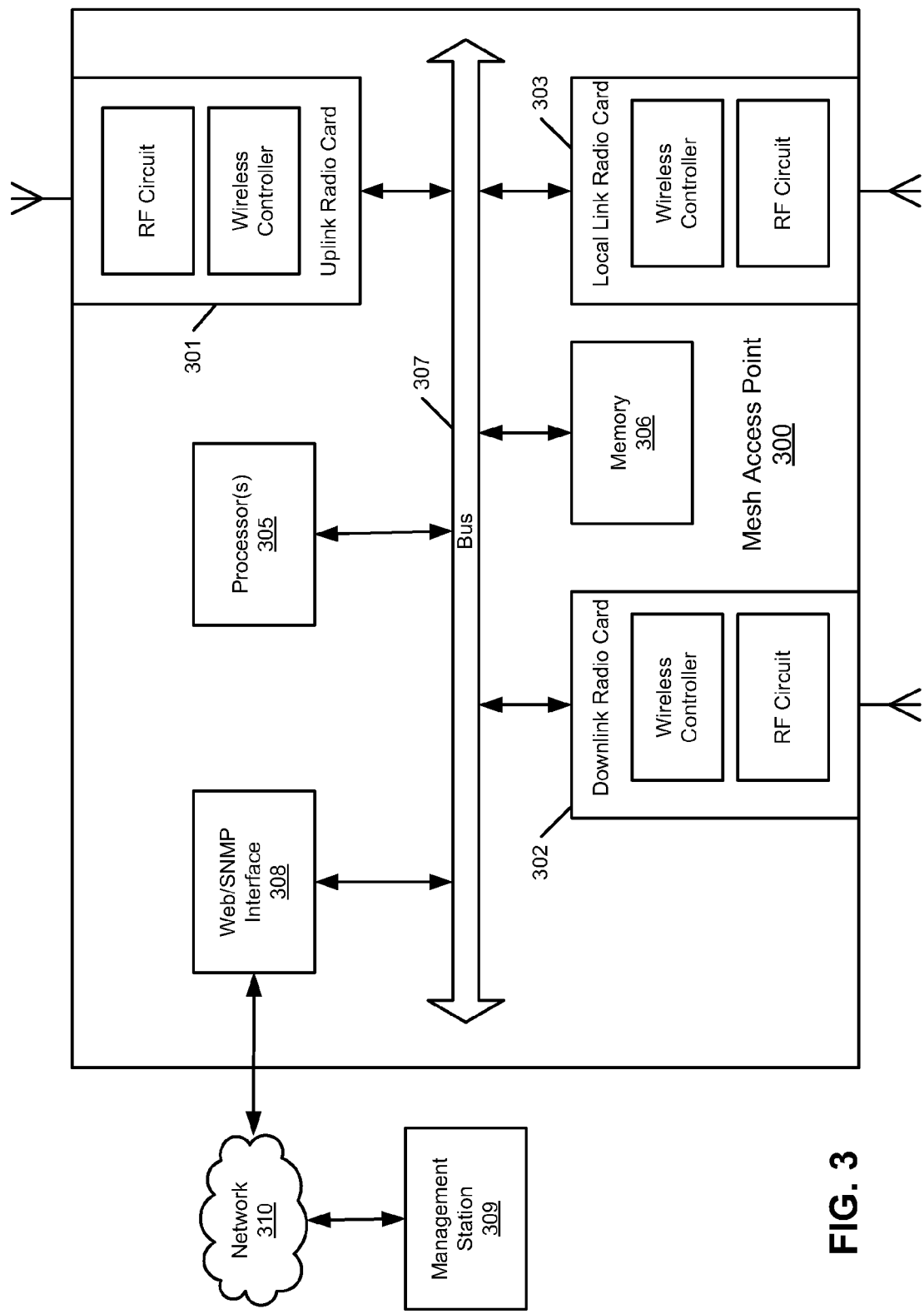
FIG. 3 is a block diagram illustrating an example of a wireless mesh access point according to one embodiment of the invention.

FIG. 3 is a block diagram illustrating an example of a wireless mesh access point according to one embodiment of the invention. For example, AP 300 may be implemented as part of AP 201 or AP 202 of FIG. 2. Referring to FIG. 3, in one embodiment, AP 300 includes, but is not limited to multiple wireless interface devices 301-303, also referred to herein as RF (radio frequency) or radio cards or devices, each having a corresponding wireless controller and necessary RF circuit, communicatively coupled to each other via bus or interconnect 307. The radio cards 301-303 may be provided by a third party vendor which also provides a software driver (e.g., layer 2 to layer 7 network drivers). In this example, AP 300 includes an uplink interface card 301 that can be used to communicate with a downlink interface of another AP. AP 300 further includes a downlink interface card 302 that can be used to communicate with an uplink interface of another AP and a local link interface card 303 used to communicate with a local client.

AP 300 further includes one or more processors 305 coupled to the bus 307. In addition, AP 300 further includes a management interface 308 to allow a management station 309 to communicate with AP 300 over a network 310 for management purposes. The routing software (not shown) may be loaded within memory 306 and executed by processor 305. For example, each of the interface cards 301-304 may be configured by the management station 309 over network 310 to operate in a particular but different frequency to reduce air interference, etc. Each interface card may be assigned with a unique interface identifier (I/F ID) that uniquely identifies the corresponding interface, physically or logically (e.g., virtual). Other configurations may exist.

FIG. 4 is a block diagram illustrating an example of software architecture of a wireless mesh access point according to one embodiment of the invention. For example, software stack 400 may be running within memory 306 by processor 305 of FIG. 3. Referring to FIG. 4, software stack 400 includes, but is not limited to, layer-3 and up network stack 402 and layer-2 network stack 404 that can process data exchanged with hardware such as radio cards 405. Radio cards 405 may be implemented as any of the radio cards 301-304 as shown in FIG. 3. Note that layer 404 and layer 402 may be provided with the hardware 405 from a third party vendor.

In addition, according to one embodiment, software stack 400 further includes layer 403, also referred to as layer 2.5 logically representing an additional layer between layer 2 and layer 3 of OSI (open system interconnection). Layer 403 includes a routing logic 406 for routing data received from different radio cards via layer 404. Any data for management application such as SNMP (simple network management protocol) application 401 is routed via layer 402. In this embodiment, since layer 403 is inserted between layer 404 and 402, the ordinary layer 2 and layer 3 do not need to modify as layer 403 is completely transparent to layers 404 and 402.

The data is routed among multiple interfaces (e.g., uplink, downlink, or local link) based on information obtained from routing table 408 and/or interface mapping table 407. Interface mapping table 407 may be implemented in a manner similar to one as shown in FIG. 5. Likewise, routing table 408 may be implemented similar to one shown in FIG. 6.

Referring to FIG. 5, interface mapping table 500 includes multiple entries. Each entry includes an interface ID field 501, a source MAC address field 502, and a destination MAC address field 503. The interface ID field 501 is used to store an ID of a particular interface of the AP. The source MAC address field 502 is used to store a MAC address corresponding to an interface card (e.g., either uplink or downlink)

identified by the interface ID stored in the interface ID field 501. The destination MAC address field 503 is used to store a MAC address of an interface card (e.g., either uplink or downlink) of a next hop AP device. The interface mapping table is used by the routing logic to tunnel a packet to a next hop.

Referring to FIG. 6, a routing table 600 includes multiple entries. Each entry includes a MAC address field 601 to store a particular MAC address (e.g., source or destination MAC address) and an interface ID field 602 to store an interface ID corresponding to a MAC address stored in MAC address field 601. This table is used to determine which interface card that a particular packet should be sent.

Figure 7:
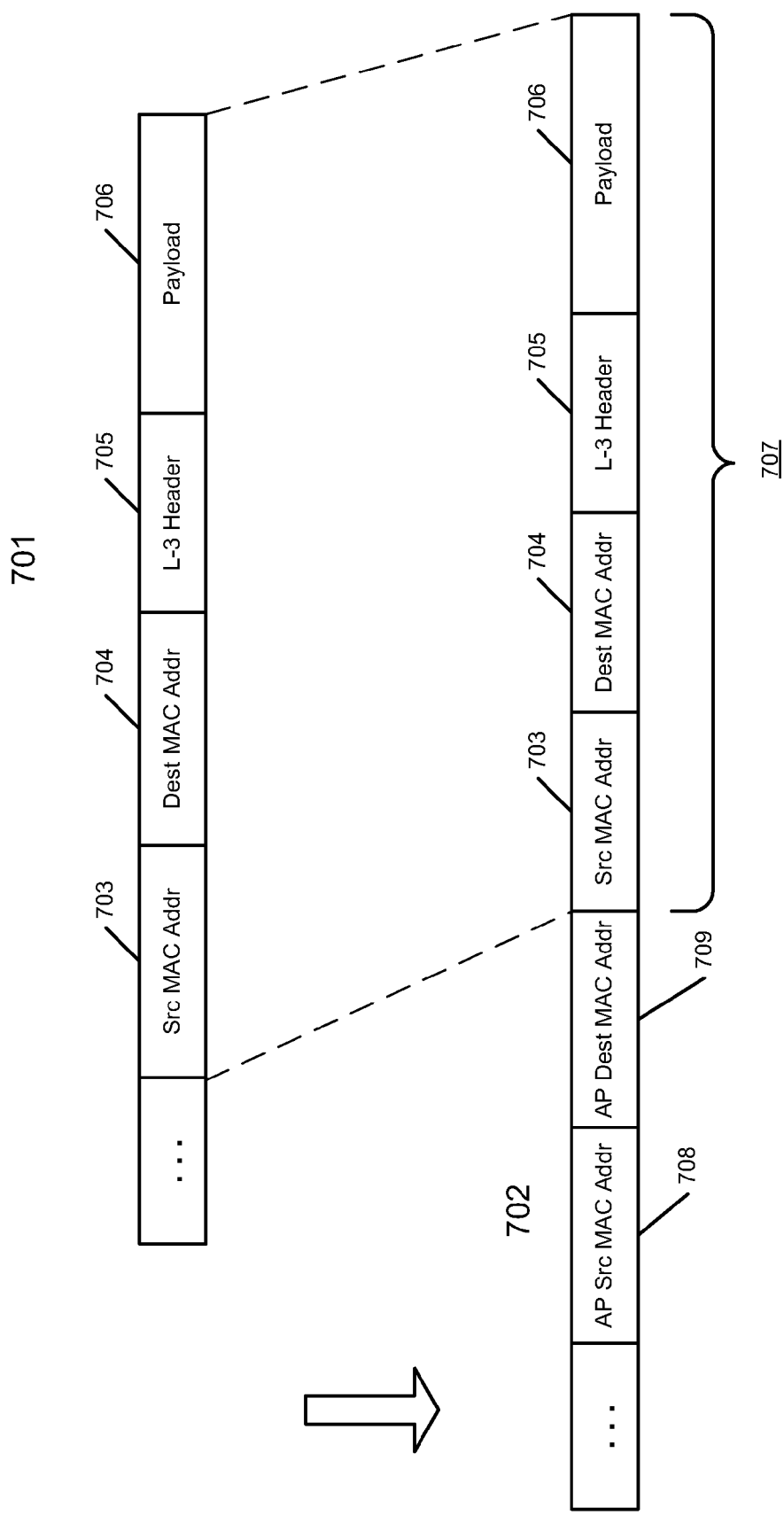
FIG. 7 is a block diagram illustrating a data packet used for tunneling according to one embodiment of the invention.

FIG. 7 is a block diagram illustrating a data packet used for tunneling according to one embodiment of the invention. Referring to FIG. 7, in this example, packet 701 is originally initiated from an end-user client such as client 211 of FIG. 2. In this example, like a standard TCP/IP packet, packet 701 includes, among others, a source MAC address 703, a destination MAC address, other layer-3 and up header 705, and payload 706.

Referring to FIGS. 2 and 7, when AP 201 receives packet 701 where AP is configured to maintain its own copy of interface mapping table (e.g., table 500 of FIG. 5) and a routing table (e.g., table 600 of FIG. 6), AP 201 may perform a lookup operation at the routing table to determine whether a source MAC address 703 (e.g., MAC address representing the end-user client 211) exists in the routing table. If not, AP 201 may store or insert a new entry into the routing table having the source MAC address 703 and an interface ID corresponding to an incoming interface of AP 201, in this example, interface 205.

In addition, according to one embodiment, AP 201 may further perform another lookup operation at the routing table based on the destination MAC address 704. It is assumed that an administrator initially has configured all the necessary routing paths in the mesh network. Thus, there should be an entry in the routing table having a MAC address corresponding to destination MAC address 704 associated with a particular interface (e.g., outgoing or egress interface) in the routing table. From the routing table, based on the destination MAC address 704, an outgoing interface ID is obtained that corresponds to, in this example, interface 203.

Further, according to one embodiment, AP 201 may further perform another lookup operation at the interface mapping table based on the interface ID obtained from the routing table to determine a pair of source MAC address 708 and destination MAC address 709, where the source MAC address 708 represents a MAC address associated with the outgoing interface of current AP and the destination MAC address 709 represents an ingress interface of a next hop AP. As a result, a new packet 702 is generated having source MAC address 708 and destination MAC address 709, where most of the original packet 701 having fields 703-706 is encrypted (e.g., tunneled) using a variety of encryption methods to generate a new payload 707 of pocket 702. Packet 702 is then transmitted to a next hop AP 202 via interface 203.

When AP 202 receives packet 702, AP 202 strips off the header having at least source MAC address 708 and destination MAC address 709 and decrypts payload 707 to reveal the original packet 701. Again, similar to operations performed by AP 201, AP 202 determines whether the revealed packet 701 is intended for its local end-user client such as client 212. If so, the revealed packet 701 is then transmitted to the local client. Otherwise, the packet 701 is then repackaged and tunneled to another AP using techniques similar to those set forth above. As a result, communications between two AP local networks can be securely performed.

Note that packets 701-702 are shown for purposes of illustration only. Other formats may also be applied. For example, instead of wrapping the original MAC addresses of the packet 701 using the AP MAC addresses to generate packet 702, the original MAC addresses of packet 701 may be replaced by the AP MAC addresses. The original MAC addresses may be relocated to some other locations such as the end of packet 702.

Figure 8:
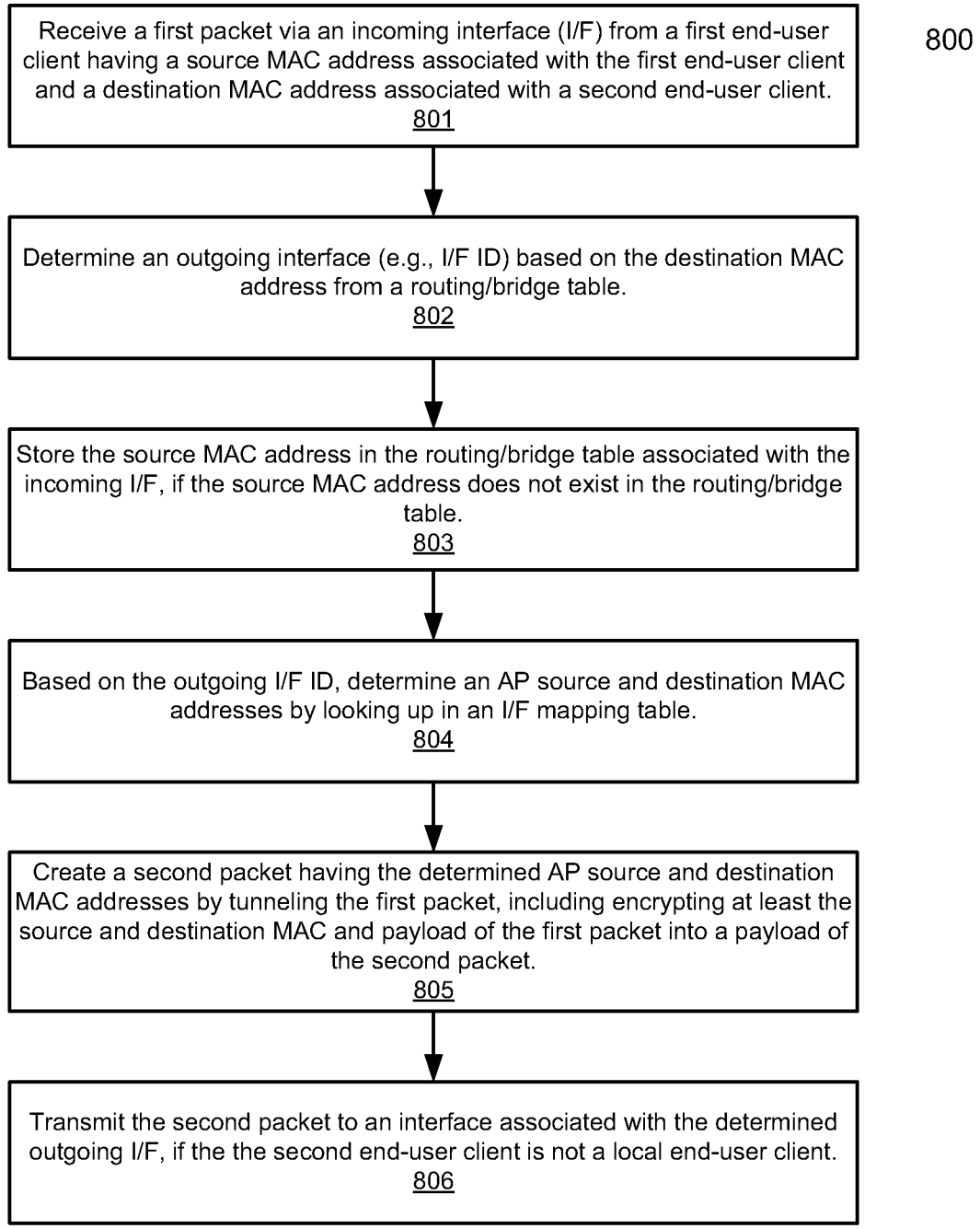
FIG. 8 is a flow diagram illustrating a process for routing a packet in a wireless mesh network according to one embodiment of the invention.

FIG. 8 is a flow diagram illustrating a process for routing a packet in a wireless mesh network according to one embodiment of the invention. Note that process 800 may be performed by processing logic which may include hardware, software, or a combination of both. For example, process 800 may be performed by a wireless mesh AP such as AP 300 of FIG. 3. Referring to FIG. 8, at block 801, a first packet (e.g., packet 701 of FIG. 7) is received via an incoming or ingress interface (e.g., local link interface) from a local end-user client having a source MAC address representing the local end-user client and a destination MAC address representing a destination end-user client.

At block 802, an outgoing or egress interface (e.g., interface ID) is determined based on the destination MAC address of the first packet. For example, the egress interface ID may be determined via a lookup operation of a routing table maintained within the respective AP (e.g., routing table 600 of FIG. 6). At block 803, if the source MAC address of the first packet does not exist in the routing table, a new entry is created in the routing table for storing the source MAC address and an interface ID corresponding to an interface from which the first packet is received.

At block 804, based on the egress interface ID determined above, an AP source MAC address and an AP destination MAC address are determined. For example, the AP source and destination MAC addresses may be determined via a lookup operation on the interface mapping table maintained within the respective AP (e.g., table 500 of FIG. 5). At block 805, a new packet or a second packet (e.g., packet 702 of FIG. 7) is created using the AP source and destination MAC address by tunneling the first packet, including encrypting at least the source and destination MAC addresses as well as the payload of the first packet. Thereafter, at block 806 the new packet is transmitted to a proper interface identified by the interface ID, which is then routed to a next hop AP.

Figure 9:
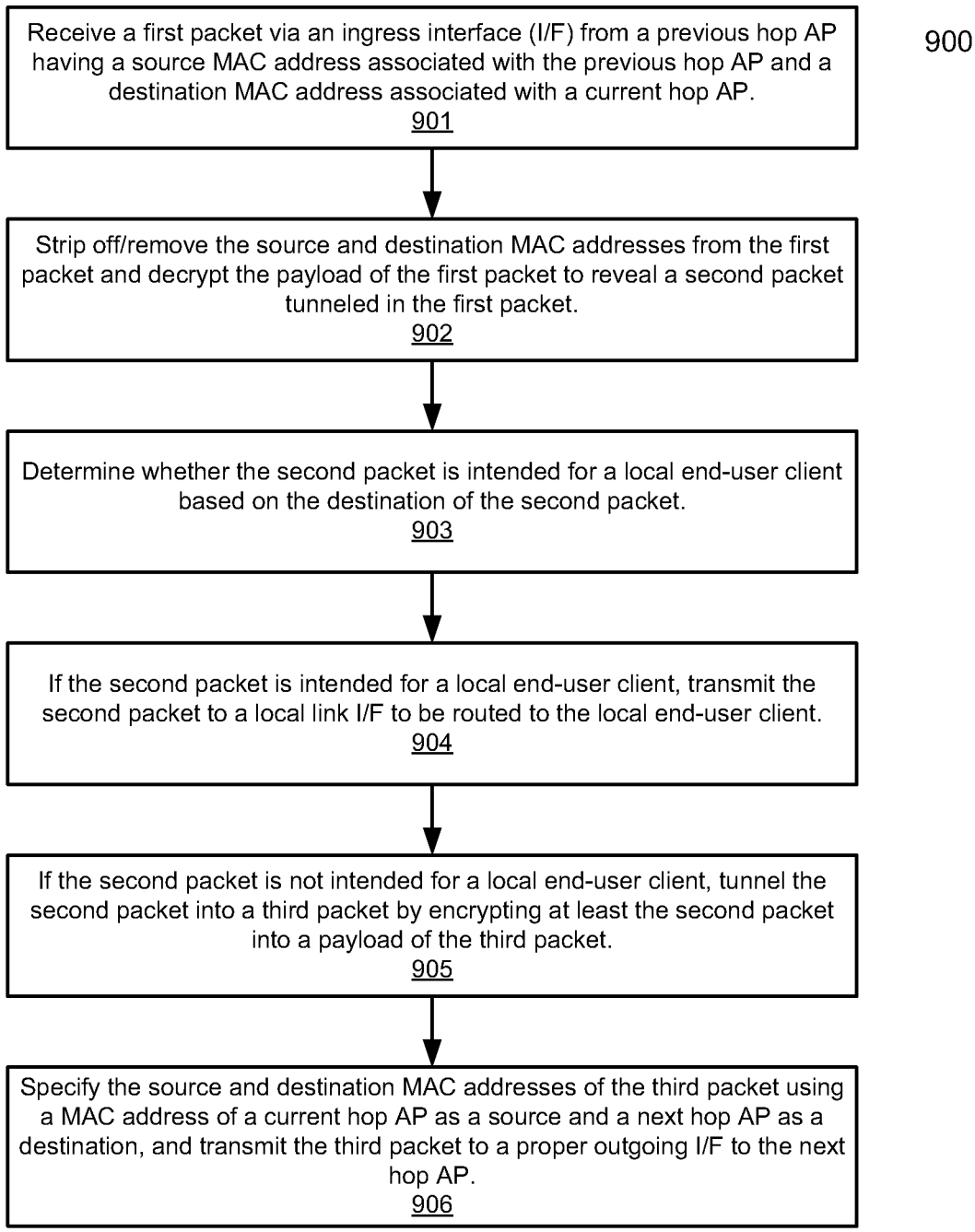
FIG. 9 is a flow diagram illustrating a process for routing a packet in a wireless mesh network according to another embodiment of the invention.

FIG. 9 is a flow diagram illustrating a process for routing a packet in a wireless mesh network according to another embodiment of the invention. Note that process 900 may be performed by processing logic which may include hardware, software, or a combination of both. For example, process 900 may be performed by a wireless mesh AP such as AP 300 of FIG. 3. Referring to FIG. 9, at block 901, a first packet is received via an incoming or ingress interface from a previous hop AP, the first packet having a first source MAC address and a first destination MAC address, as well as a payload. The first source MAC address is associated with an egress interface of the previous hop AP and the destination MAC address is associated with an ingress interface of the current hop AP. Note that the ingress interface of the current hop AP may be an uplink interface or a downlink interface. Similarly, an egress interface of a previous hop AP may be an uplink interface or a downlink interface.

At block 902, the source and destination MAC addresses of the first packet is stripped off and the payload is decrypted to reveal a second packet that has been tunneled within the first packet. The second packet includes a second source MAC address associated with a first end-user client (e.g., original end-user client that initiates the first packet form a local link)

and a destination MAC address associated with a second end-user client as a destination end-user client intended to receive the first packet.

At block 903, it is determined whether the second packet is intended to a local end-user client of a current hop AP (e.g., whether the second end-user client is a local end-user client). For example, a lookup operation may be performed at a routing table maintained by the current hop AP based on the destination MAC address of the second packet (e.g., whether an interface ID corresponding to the destination MAC address of the second packet represents a local link interface of a current hop AP). If the second packet is intended to a local end-user client of a current hop AP, at block 904, the second packet is transmitted to the intended local end-user client via a local link interface of the current hop AP.

If the second packet is not intended to a local end-user client of a current hop AP, at block 905, the second packet is then tunneled within a third packet, and the third packet is then transmitted to a next hop AP using techniques similar to those set forth above. Other operations may also be performed.

Multi-Radio Wireless Mesh Network Solutions

Figure 10:
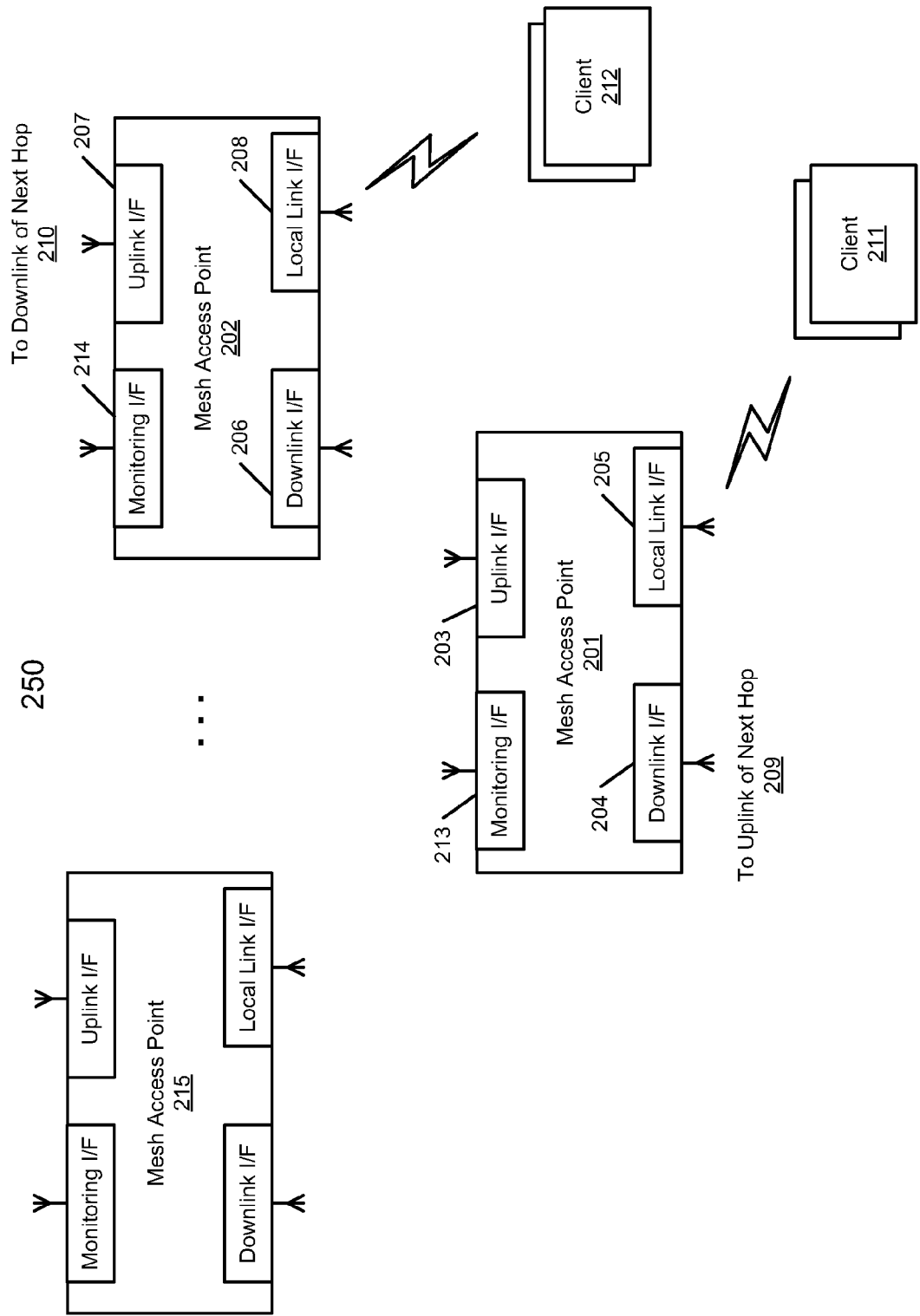
FIG. 10 is a block diagram illustrating a mesh network configuration according to another embodiment of the invention.

FIG. 10 is a block diagram illustrating a mesh network configuration according to another embodiment of the invention. For example, network configuration 250 may be implemented as part of those as shown in FIGS. 1-2. Note that for the purpose of illustration, certain reference numbers for the components having similar functionality are maintained the same. Referring to FIG. 10, similar to network configuration 200 of FIG. 2, AP 201 includes an uplink interface 203 and a downlink interface 204, as well as a local link interface 205 for local clients 211. Similarly, AP 202 includes an uplink interface 207, a downlink interface 206, and a local link interface 208 for local clients 212. Downlink interface 204 of AP 201 is used to communicate with an uplink interface of a next hop 209. Uplink interface 207 of AP 202 is used to communicate with a downlink interface of a next hop 210. Uplink interface 203 is used to communicate with a downlink interface 206 of AP 202.

Typically, a local link interface communicates with a local client using a communication frequency of approximately 2.4 GHz using a standard wireless protocol such as, for example, IEEE 802.11b/g protocol. The communication frequency of the backhaul or mesh link communications is ranging approximately from 4.9 to 5.8 GHz using a standard wireless protocol such as, for example, IEEE 802.11a protocol. However, according to one embodiment, each mesh link may operate at a different communication frequency. For example, with respect to a particular AP, the communication frequency of a downlink interface is different than the communication frequency of an uplink interface. As a result, air interference is greatly reduced.

Furthermore, the communications between downlink interface 206 of AP 202 and uplink interface 203 of AP 201 are securely performed using a tunneling protocol and/or a variety of encryption techniques. For example, when AP 201 receives a packet form a local client 211, the AP 201 encrypts almost the entire packet to generate a new packet having a source MAC address of AP 201 and a destination MAC address of AP 202. The new packet is then routed from AP 201 to AP 202 via uplink interface 203 of AP 201 and downlink interface 206 of AP 202.

When AP 202 receives the new packet, AP 202 strips out the header (e.g., source and destination MAC addresses) and decrypts the payload of the new packet to reveal the original packet originated from end user client 211. Based on the destination MAC address of the revealed original packet, AP 202 determines whether the original packet is destined to a local end-user client such as client 212. If the original packet is destined to a local end-user client, AP 202 then routes the original packet to the local client via local link interface 208. However, if the original packet is not destined to a local end-user client, AP 202 may repackage or re-tunnel the original packet with a source MAC address of AP 202 and a destination MAC address of a next hop, which may be an AP communicatively coupled via uplink interface 207 or another AP communicatively coupled via downlink interface 206.

In addition, in one embodiment, each mesh AP includes a monitoring interface (e.g., a separate wireless antenna) for monitoring purposes. For example, AP 202 includes monitoring interface 214 and AP 201 includes monitoring interface 213. In one embodiment, each AP includes a monitoring or scan logic (not shown) configured to monitor or scan via its associated monitoring interface or antenna neighboring routing information and to decide whether there is a need to reroute network traffic through a better routing path. A better path may be identified based on various information obtained by the monitoring logic from neighboring APs, such as, for example, based on signal strength, hop count, and a number of downlink stations, etc. A path having a shorter hop count, a stronger signal to noise ratio (SNR), and less number of downlink stations associated it may be a better path. Such information may be received as part of a beacon signal broadcast by each AP.

For example, with respect to AP 201, when the monitoring logic monitors and detects via monitoring interface 213 that a path via AP 215 is a better path than an existing path via AP 202, the management logic (not shown) of AP 201 may reconfigure uplink interface 203 to be associated with a downlink of AP 215, rather than the downlink of AP 202.

Further, according to one embodiment, the monitoring logic of each AP may monitor environment and to change channel assignment of the downlink channels and local link channels. The channel reassignment may be performed during and/or after routing of traffic. For example, if congestion of a particular channel of a downlink radio and/or local link radio reaches certain threshold, a new channel reassignment for the downlink and local link is performed. The congestion may be determined based on variety of parameters such as overall SNR of each AP and the number of APs currently associated with a particular channel, etc. Typically, stronger SNR of a particular channel may suggest higher probability of conflict or interference. Similarly, a channel having a higher number of downlink APs may suggest certain degrees of traffic congestion. Note that the monitoring and configuration techniques may be performed by logic (e.g., implemented in software, hardware, or both) automatically according to certain programmable algorithms that may be stored in a machine readable storage medium (e.g., memory or storage device) of the corresponding AP.

Furthermore, the monitoring logic and interface may also be used for security purposes. According to one embodiment, the monitoring logic via its monitoring antenna may monitor other surrounding APs and to determine whether a particular AP is a rogue AP (e.g., an unauthorized or non-authenticated device). In one embodiment, the monitoring logic of an AP may send a specific message to another AP and examine the response from the recipient. Based on the response (or non-response), the monitoring logic determines whether the recipient is a rogue AP. Here, given a specific message, the monitoring logic expects a specific reply. If the reply does not include a signature that matches a predetermined pattern, the recipient AP may be considered as a rogue AP. Alternatively, the monitoring logic may access or log into another AP to examine a particular key component (e.g., chip ID) to determine whether that AP is a rogue AP. If it is determined that a particular AP is a rogue AP, a message may be sent to a management system for security purposes. Other configurations may exist.

Figure 11:
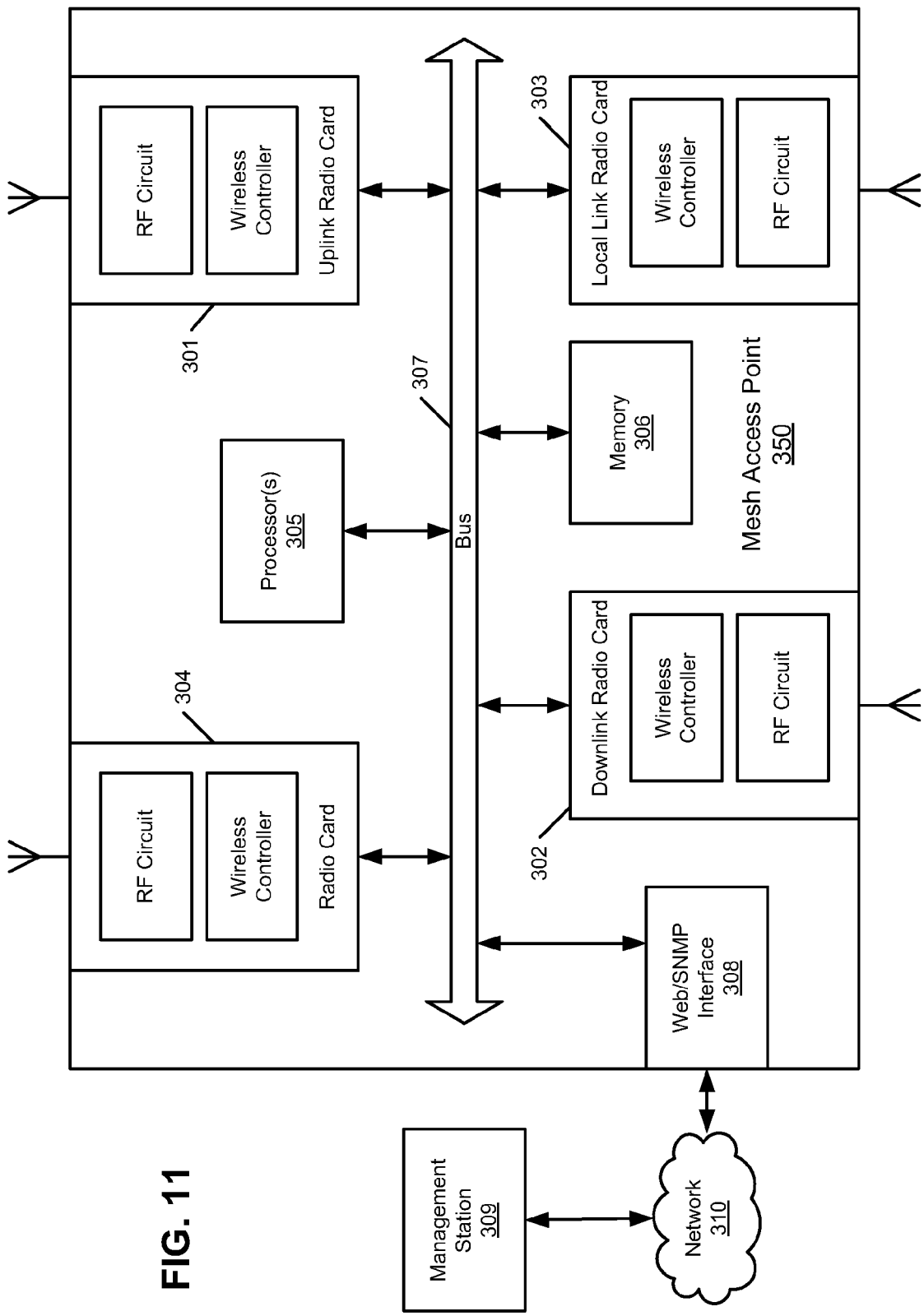
FIG. 11 is a block diagram illustrating an example of a wireless mesh access point according to another embodiment of the invention.

FIG. 11 is a block diagram illustrating an example of a wireless mesh access point according to another embodiment of the invention. For example, AP 350 may be implemented as part of AP 201 or AP 202 of FIG. 2. Referring to FIG. 11, similar to the one as shown in FIG. 3, in one embodiment, AP 350 includes, but is not limited to multiple wireless interface devices 301-304, also referred to herein as RF (radio frequency) or radio cards or devices, each having a corresponding wireless controller and necessary RF circuit, communicatively coupled to each other via bus or interconnect 307. The radio cards 301-304 may be provided by a third party vendor which also provides a software driver (e.g., layer 2 to layer 7 network drivers). In this example, AP 350 includes an uplink interface card 301 that can be used to communicate with a downlink interface of another AP. AP 350 further includes a downlink interface card 302 that can be used to communicate with an uplink interface of another AP and a local link interface card 303 used to communicate with a local client.

AP 350 further includes one or more processors 305 coupled to the bus 307. In addition, AP 350 further includes a management interface 308 to allow a management station 309 to communicate with AP 350 over a network 310 for management purposes. The routing software (not shown) may be loaded within memory 306 and executed by processor 305. For example, each of the interface cards 301-304 may be configured by the management station 309 over network 310 to operate in a particular but different frequency to reduce air interference, etc. Each interface card may be assigned with a unique interface identifier (I/F ID) that uniquely identifies the corresponding interface, physically or logically (e.g., virtual). Other configurations may exist.

Furthermore, AP 350 includes a monitoring interface card 304 used to monitor or survey the mesh networks which may be used to reassign or balance the APs in the network such that the devices in the network can optimally operate. For example, monitoring interface card 304 may include monitoring logic for monitoring purposes using certain techniques described above.

As described above, each AP may actively monitor using the corresponding monitoring logic and monitoring antenna mesh links of the mesh network. If a better mesh link path is available, its uplink interface may be reconfigured to be associated with the better mesh link or path. Similarly, if a better channel is available, its downlink and/or local link may be reassigned with another channel. The monitoring features may also be utilized for fault tolerance purpose. For example, if a managing node is down and detected by a monitoring logic of an AP, the AP may notify and cause other APs to switch to another managing node of the mesh network. Once the down managing node is up and running, the monitoring logic may detect that and cause the traffic to be rerouted back to the resumed managing node. It can also be applied to redundancy purposes, where when one manager node down, all nodes will be automatically connected to next available manager node to maintain services.

This monitoring feature can be used to implement an "always connect" feature of the mesh network. Such a feature forces a mesh AP node to be associated with another node having a lower SNR if the mesh AP node does not have any other better node to establish a mesh link. The monitoring feature may also be applied to determining bandwidth scores of each mesh link, for example, based on hop count, signal quality, and mesh manager weight, etc., which may be collected through the monitoring logic and its associated monitoring interface. The bandwidth scores may affect the routing decision of each node on the mesh network. For example, more nodes may be associated with a manager node having a higher bandwidth score. Other areas may also be applied herein.

Figure 12:
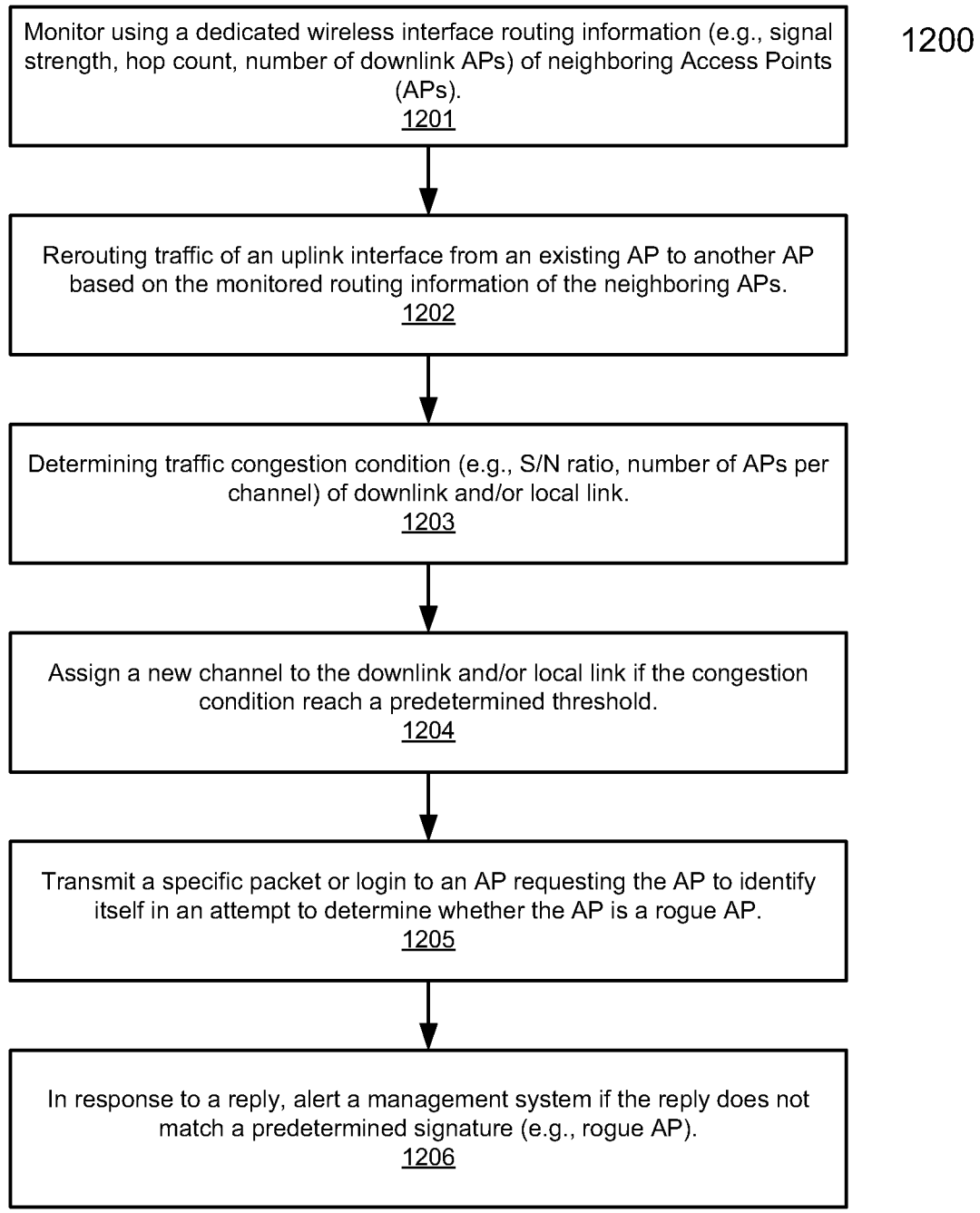
FIG. 12 is a flow diagram illustrating a method performed by a mesh AP according to one embodiment of the invention.

FIG. 12 is a flow diagram illustrating a method performed by a mesh AP according to one embodiment of the invention. Note that method 1200 may be performed by processing logic which may include software, hardware, or a combination of both. For example, method 1200 may be performed by any AP as described above. Referring to FIG. 12, at block 1201, processing logic monitors via a dedicated wireless interface (e.g., dedicated monitoring antenna) routing information (e.g., strength, hop count, number of downlink APs, etc.) of neighboring APs. Based on the monitored information, if there is a better path, at block 1202, the uplink traffic is rerouted to the better path (e.g., from one AP to another AP coupled to the uplink interface). At block 1203, processing logic monitors traffic congestion conditions (e.g., SNR, number of APs per channel, etc.) of downlink interface and/or local link interface. If there is a traffic congestion based on the monitored traffic congestion conditions, at block 1204, a new channel may be assigned to the downlink and/or local link. At block 1205, processing logic transmits via the dedicated monitoring antenna a specific message or packet to another AP requesting that AP to identify itself in an attempt to determine whether that AP is a rogue AP. Based on the response from the suspect AP, at block 1206, the management system is alerted if the response does not match a predetermined signature, which indicates that the suspect AP is a rogue AP. Other operations may also be applied.

Efficient Handoff Scheme for Wireless Mesh Network

As mentioned above, IEEE 802.11 wireless application has long been a problem of delay and latency of its wireless roaming hand-off process. Because WiFi connection of 802.11 physical layer association process and network layer establishment involving IP re-establishment need a long time to complete, an application will get disconnected. This long WiFi hand-over time prevents implementation of real-time applications such as mobile video surveillance and mobile voice conversation, etc. This drawback hinders the development of mobile applications using the most cost effective 802.11 technology. Traditional mobile virtual private network (VPN) solutions only solve user network equipment IP address remaining the same during roaming to maintain an application alive. However, obtaining a local IP address and switching from one access point (AP) to another AP still have the problem of taking a long time to perform. Thus, VPN is not suitable for true WiFi mobile applications.

On WiFi technology, there is no hand-off scheme. Thus for mobile device crossing cell by cell of each AP (Access Point) which is usually called roaming, it may lose a connection of the current AP before connecting to the other AP. Thus there is a period of time the mobile device has no connection. That time is called hand-off. Because of the hand-off time, user's connection will be cut off depending on different application implementations. TCP/IP will try to do reconnect in this situation, but the recovery time is several seconds. So it has been a long lasting problem in the market of how to do hand-off faster in WiFi environment. For high speed moving vehicle, this is an even more serious problem. For 200 km/h moving train, it means every around 10 seconds there will be hand-off for WiFi wireless infrastructure.

According to some embodiments, a mobile device at any time is communicatively coupled to at least one AP of a mesh network. During the handoff, the mobile device may concurrently coupled to at least two APs, before one of them is disconnected. As a result, the mobile device is always connected to at least one AP such that there would be no loss during the handoff. The design concept is based on two radios approach. A special algorithm design to make two radios to switch from cell to cell at different pace so there is always either one radio or two radios connecting to AP(s). There is no time that both radios do not connect. So the network is always connected in a sense. A set of special tunneling design and network architecture design on layer 2 and 3 are implemented to guarantee this special design work well in both data link (layer 2) and network (layer 3) layers. This scheme is capable of supporting seamlessly roaming speed of less than 10 seconds stay in an AP cell. With more distance support of AP to AP, this approach can support vehicle speed of even at 500 km/h with up to 25 Mbps seamlessly WiFi connection speed.

In one embodiment, at the beginning, the mobile device is connected to two best signal APs. Thus, two links will be on at the same time. Once one link signal level result based on a predetermined algorithm analysis is not preferred which is either below certain threshold level or to not meet certain specifically designed criteria, then that link will be disconnected. The operating environment is re-evaluated to select another best AP (except the AP connected by the other link), if available and with better signal strength and quality, and then connect to that AP.

In one embodiment, during the handoff, the network path through two links are well managed to not cause network looping, to command network to do fast switching of those two links, and to guarantee an end user device behind mobile device does not feel the two mobile links are actually up and down frequently, which are all done by detail driver and application software design to implement packet traffic direction control, network path updating, and layer2/layer3 tunneling. For layer-2 tunneling implementation, there is another device called mobile server to act as the other end of tunneling for each mobile device. For layer-2 & layer-3 tunneling implementation, this layer-2 mobile server is implemented as part of a mesh manager, then this mesh manager will implement layer-3 tunneling to a remote site layer-3 mobile server. It is a two-layer implementation.

Figure 13:
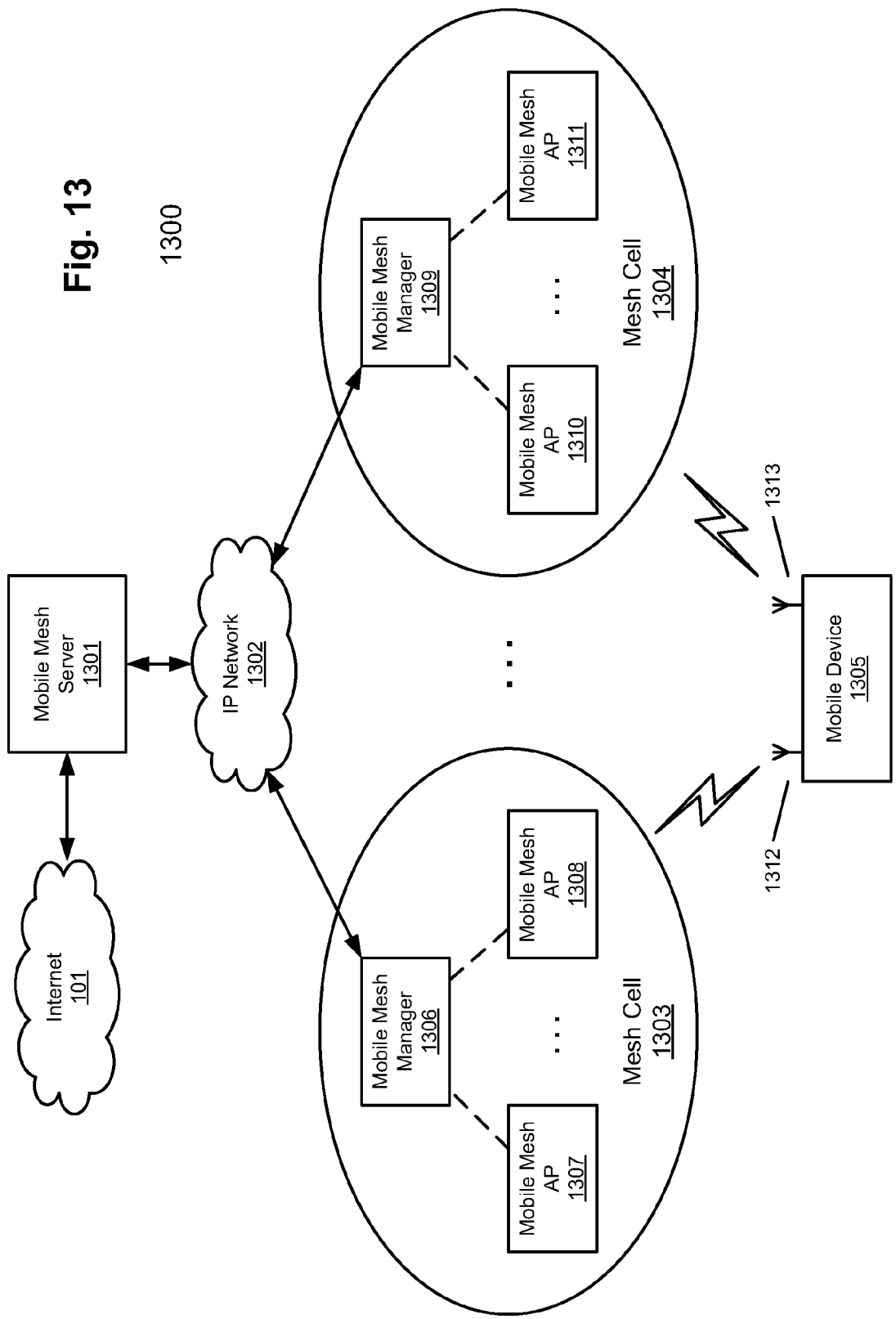
FIG. 13 is a block diagram illustrating a wireless mesh network system according to one embodiment of the invention.

FIG. 13 is a block diagram illustrating a wireless mesh network system according to one embodiment of the invention. For example, system 1300 may be implemented as a part of system 100 of FIG. 1. Referring to FIG. 13, system 1300 includes a mobile mesh server 1301 communicatively coupled to one or more mesh cells 1303-1304 over an IP network 1302, which may be a fiber optics network. Each of mesh cells 1303-1304 includes one or more mesh APs 1306-1308 and 1309-1311, respectively, communicating with each other to form the respective mesh cell.

Among the mesh APs in each cell, one of the mesh APs is configured to a mobile mesh manager (MMM) for that mesh cell, where an MMM of a particular mesh call is responsible to communicate with MMS 1301 on behalf of the rest of the mesh APs of that particular mesh cell. In this example, mesh AP 1306 is configured to be an MMM for mesh cell 1303 while mesh AP 1309 is configured to be an MMM for mesh cell 1304. Thus, instead of each of mesh APs 1306-1308 directly communicating with MMS 1301, all communications are directed to MMM 1306, which in turns tunnels them to MMS 1301, or vice versa.

According to one embodiment, each of the mesh APs 1306-1311, which may be configured as an MMM, supports tunneling with MMS 1301 in which a mesh AP can build a layer-3 tunnel, similar to a VPN tunnel, connected to MMS 1301. An MMM may automatically attempt to setup a tunnel to MMS 1301 using an IP address of MMM and an IP address of MMS 1301, where the IP address of MMS 1301 may be known to the MMM ahead of time. For a single mesh network, an MMM is the mobile tunneling client for the entire mesh network. Mobile traffic of this mesh network is routed from the MMM through tunneling to MMS 1301 over IP network 1302. MMS 1301 may reside anywhere worldwide as long as the MMM can communicate with it with a specific IP address of MMS 1301. Both MMS 1301 and the MMM can be behind any IP router including network address translation (NAT) configuration.

In one embodiment, each of MMMs 1306 and 1309 acts as a tunneling client to establish a layer-3 tunnel to MMS 1301. Once an MMM is configured with an IP address of MMS 1301, the MMM may automatically establish a link and tunnel with MMS 1301. This layer-3 tunnel may be maintained at all time between the MMM and MMS 1301. However, an MMM may have to periodically communicate (e.g., refresh) with the MMS in order to keep the layer-3 tunnel alive (e.g., every 24 hours). As a result, every time when mobile device 1305 moves from one mesh AP to another, it does not have to obtain a local IP address again to establish a new layer-3 tunnel, which takes a relatively longer period of time.

MMS 1301 may be implemented as part of gateway device 102 of FIG. 1. In one embodiment, MMS 1301 is capable of self-learning mobile equipments when they roam from a mesh network (e.g., mesh cell) to another mesh network. MMS 1301 can keep track of which mobile device is currently associated with which MMM, etc. Since there is no need to set up a new tunnel for mobile equipment roaming from mesh cell to mesh cell, mobile equipment's IP address can be maintained at all time as if its network connection were never broken.

Mobile device 1305 may be implemented as any of clients 107-114 of FIG. 1. Mobile device 1305 may communicate any one of the mesh APs 1306-1311 of mesh cells 1303-1304 dependent upon the circumstances, such as signal quality of the wireless links. In order to access an external network such as Internet 101, mobile device has to communicate with at least one of the mesh APs 1306-1311, which channels the communications with MMS 1301 to access external network 101, or vice versa.

Mobile device 1305 may be used to interconnect between various network devices, such as, for example, personal computer, surveillance camera, or vehicle network equipment) and a mesh AP. In one embodiment, mobile device 1305 may be a compact and specially configured radio WiFi client that is able to connect with a mesh AP at a very fast roaming speed. Mobile device 1305 can support almost zero second hand-off time of roaming from one mesh cell to another mesh cell.

In one embodiment, mobile device 1305 includes one or more ports to be coupled to a variety of end-user equipments. Alternatively, mobile device 1305 may be integrated with end-user equipment. Equipments coupled to mobile device 1305 can experience continuous WiFi connection when roaming among WiFi cells (e.g., mesh cells 1303-1304). During roaming among mesh cells, mobile device 1305 may continuously monitor and analyze signal strength of surrounding mesh APs along its moving path. Once there is a better mesh AP available, mobile device 1305 may switch to associated with the better mesh AP.

According to one embodiment, mobile device 1305 includes at least two RF interface devices (e.g., wireless transceivers), each having its own network address, such as a media access control (MAC) address. Each of the RF interface device can independently communicate with a mesh AP. During normal operations, typically only one of the RF interface devices is utilized. However, during roaming, both RF interface devices can be used to maintain multiple connections such that no data is lost during hand-off.

For example, according to one embodiment, it is assumed that mobile device 1305 is associated with and communicates mesh AP 1308 initially over a first wireless connection via a RF interface 1312, where the first wireless connection is based on a MAC address of RF interface 1312 (e.g., layer-2 routing). When mobile device 1305 moves away from mesh cell 1303 towards mesh cell 1304, at a certain point, a monitoring logic (not shown) of mobile device 1305 detects that the signal quality (e.g., based on received signal strength indicator or RSSI) drops below a predetermined threshold, mobile device 1305 is configured to establish a second wireless connection with mesh AP 1310 of mesh cell 1304 via RF interface 1313, where the second wireless connection is established based on the MAC address of RF interface 1313 (e.g., layer-2 routing).

During the roaming, both wireless connections are concurrently maintained. Thus, there is at least one wireless connection between mobile device 1305 and any one of the mesh cells 1303-1304 at any given time, such that no delay of hand-off or packet lost during roaming. In one embodiment, when mobile device 1305 roams from mesh cell 1303 to mesh cell 1304, mobile device 1305 establishes the second wireless connection with one of the mesh APs in mesh cell 1304, in this example, mesh AP 1310. Once the second wireless connection has been successfully established, any new packets from mobile device 1305 and the corresponding returning packets (e.g., new session) are transmitted over the second wireless connection via RF interface 1313. Any residue of packets of existing sessions on the way back are still transmitted over the first wireless connection via RF interface 1312, until no more residue packets or a predetermined period of time (e.g., one second) lapses.

In this scenario, mobile device 1305 operates in a wireless distribution system (WDS) mode similar to a bridge, so that original packets originated from end-user equipment can be exchanged at layer 2 behind the MAC address of mobile device 1305. The MAC address of mobile device 1305 is only utilized to establish a wireless connection. The original packets from and to end-user equipment are not modified by mobile device 1305.

A WDS is a system that enables the wireless interconnection of APs in an IEEE 802.11 network. It allows a wireless network to be expanded using multiple APs without the need for a wired backbone to link them, as is traditionally required. The notable advantage of WDS over other solutions is that it preserves the MAC addresses of client frames across links between APs. An AP can be a base basestation, relay basestation, or remote basestation. A main basestation is typically connected to the wired Ethernet. A relay basestation relays data between remote basestations, wireless clients, or other relay basestations to either a main or another relay basestation. A remote basestation accepts "client" are made using MAC address rather than by specifying IP assignments. WDS may also be referred to as a repeater mode because it appears to bridge and accept wireless clients at the same time.

Figure 14:
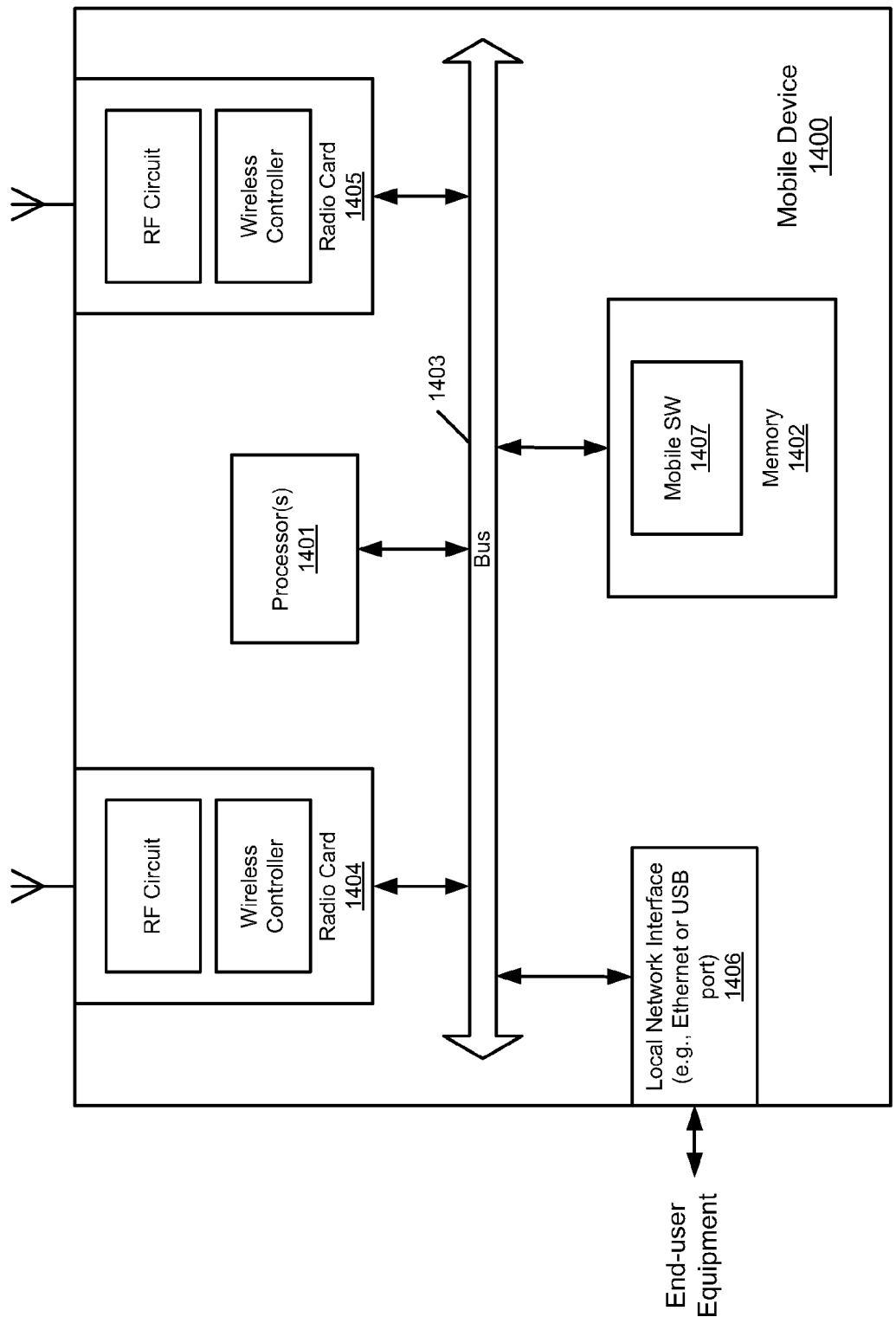
FIG. 14 is a block diagram illustrating a mobile device according to one embodiment.

FIG. 14 is a block diagram illustrating a mobile device according to one embodiment. For example, mobile device 1400 may be implemented as part of mobile device 1305 of FIG. 13. Referring to FIG. 14, in one embodiment, mobile device 1400 includes, but is not limited to multiple wireless interface devices 1404-1405, also referred to herein as RF (radio frequency) or radio cards or devices, each having a corresponding wireless controller and necessary RF circuit, communicatively coupled to each other via bus or interconnect 1403. The radio cards 1404-1405 may be provided by a third party vendor which also provides a software driver (e.g., layer 2 to layer 7 network drivers).

Mobile device 1400 further includes one or more processors 1401 coupled to the bus 1403. In addition, mobile device 1400 further includes one or more local network interfaces 1406, such as, for example, Ethernet or USB ports, for coupling one or more end-user equipments (e.g., personal computers). The mobile software (SW) 1407 may be loaded within memory 1402 and executed by processor 1401. Each interface card may be assigned with a unique interface identifier (I/F ID) that uniquely identifies the corresponding interface, physically or logically (e.g., virtual).

In one embodiment, each of RF interface cards 1404-1405 may be associated with a unique MAC address for establish a wireless connection with a mesh AP. In one embodiment, each of RF interface cards 1404-1405 can independently establish a wireless connection with different mesh APs using its respective MAC address for roaming purposes as described above. For example, while mobile device 1400 communicates with a first mesh cell via one of the RF interfaces (e.g., RF interface card 1404), mobile SW 1407 detects that the signal quality drops below a predetermined threshold as mobile device 1400 roams from the first mesh cell to a second mesh cell. In response to the detection, mobile SW 1407 may establish a second wireless connection with the second mesh cell via RF another RF interface card (e.g., RF interface card 1405), while concurrently maintain the first wireless connection. After the second wireless connection has been successfully established, mobile SW 1407 switches the traffic from the first wireless connection over to the second wireless connection. Note that mobile device 1400 may be implemented as a standalone device that can be utilized by one or more end-user devices coupled to local network interface 1406. Alternatively, mobile device 1400 may be integrated with an end-user device.

Figure 15:
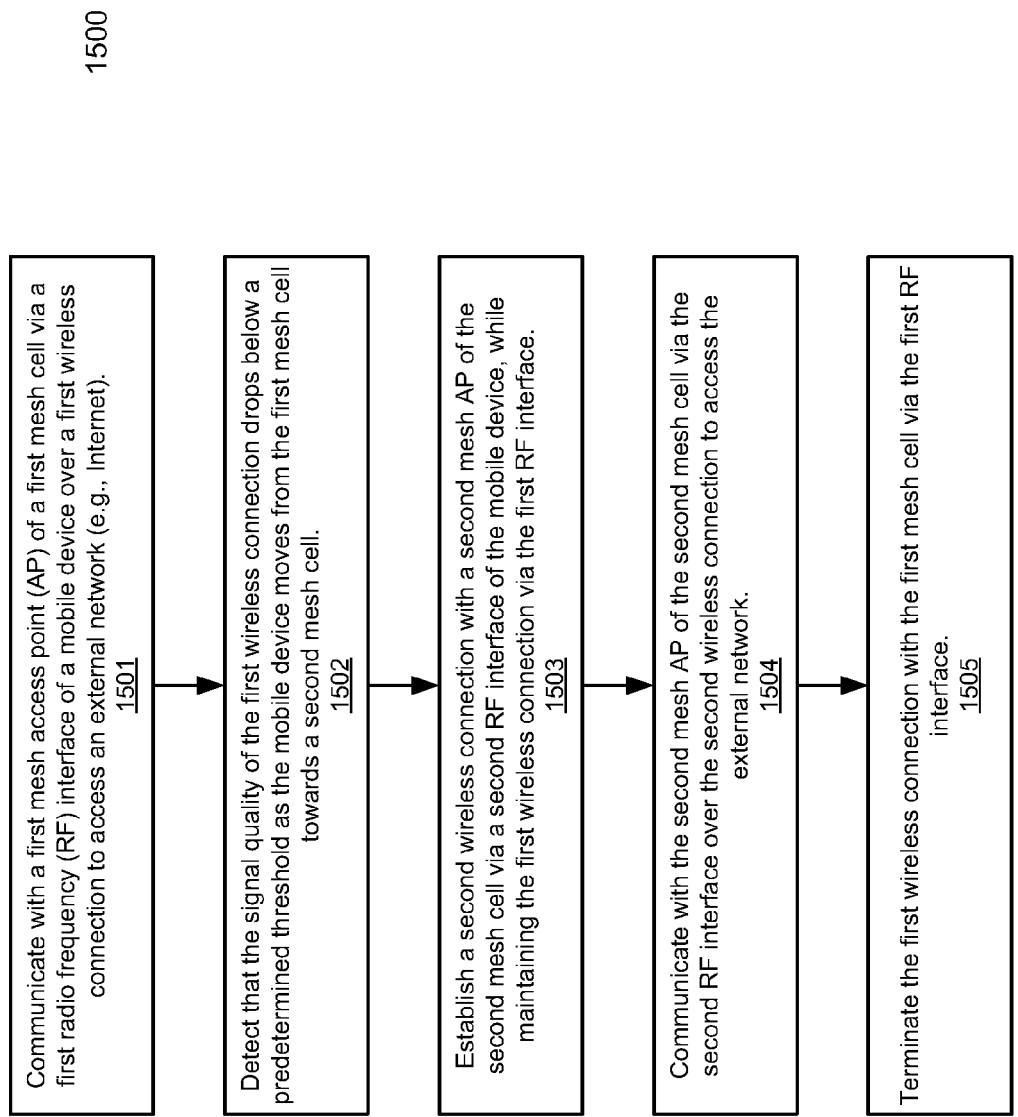
FIG. 15 is a flow diagram illustrating a method for roaming among multiple mesh cells according to one embodiment of the invention.

FIG. 15 is a flow diagram illustrating a method for roaming among multiple mesh cells according to one embodiment of the invention. For example, method 1500 may be performed by mobile device 1400 of FIG. 14. Referring to FIG. 15, at block 1501, processing logic communicate with a first mesh AP of a first mesh cell via a first RF interface of the mobile device over a first wireless connection to access an external network (e.g., Internet). At block 1502, it is detected that the signal quality of the first wireless connection drops below a predetermined threshold as the mobile device moves from the first mesh cell towards a second mesh cell. In response to the detection, at block 1503, processing logic establishes a second wireless connection with a second mesh AP of a second mesh cell via a second RF interface of the mobile device, while the first wireless connection is concurrently maintained via the first RF interface of the mobile device. Once the second wireless connection has been successfully established, at block 1504, new packets or new session of network traffic will be exchanged over the second wireless connection, while residue packets of existing sessions may still be carried over the first wireless connection. Thereafter, at block 1505, the first wireless connection is terminated after a predetermined period of time.

Figure 16:
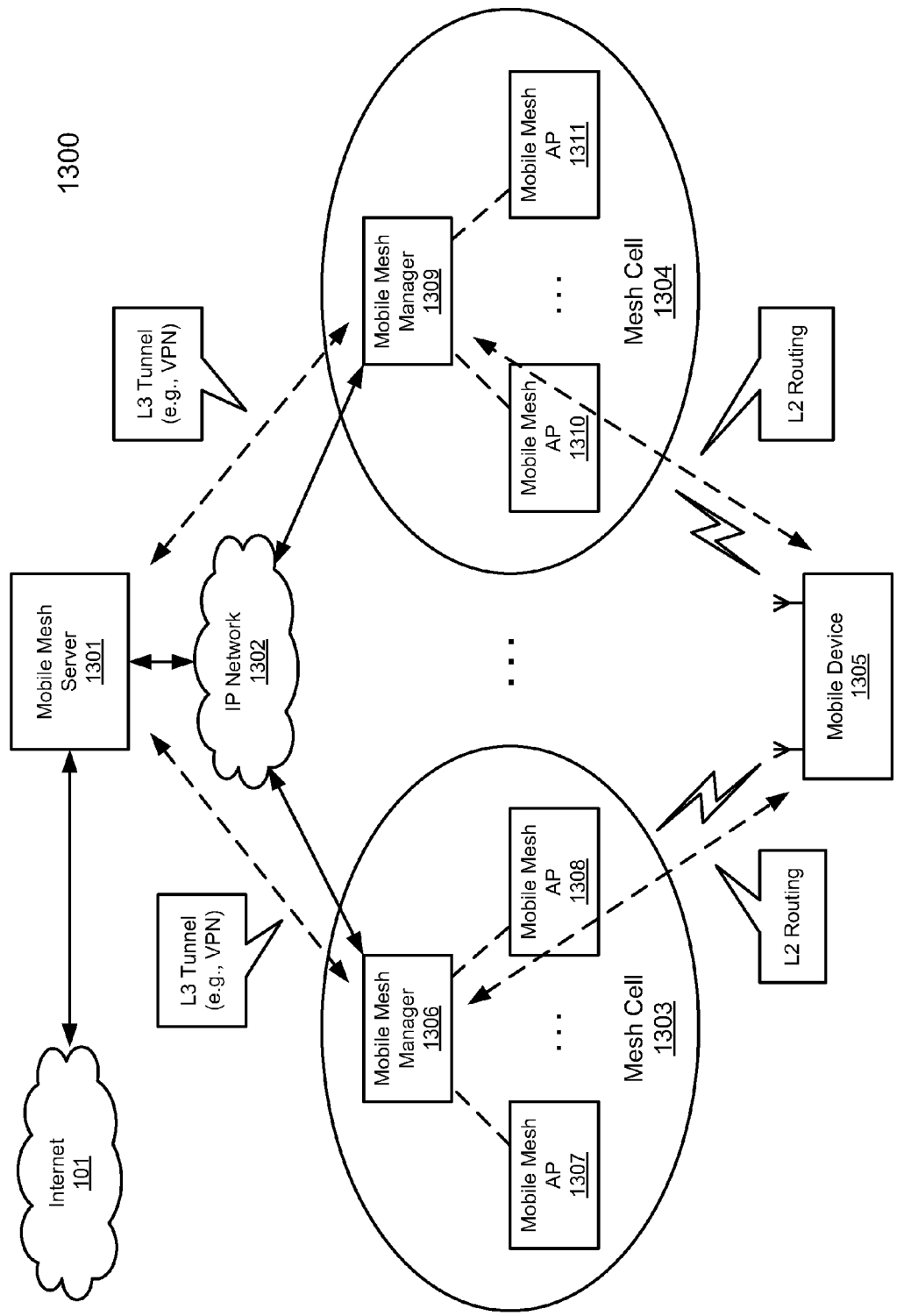
FIG. 16 is a block diagram illustrating a mesh network configuration with L2/L3 tunneling according to one embodiment of the invention.

According to certain embodiments, in order to support the seamless roaming described above, dynamic layer-2/layer-3 (L2/L3) tunnel techniques are utilized. FIG. 16 is a block diagram illustrating a mesh network configuration with L2/L3 tunneling according to one embodiment of the invention. Referring to FIG. 16, which is substantially replicated from FIG. 13, communications between a mobile device and a mesh AP (or MMM) are routed via L2 switching while communications between an MMM and an MMS are performed via an L3 tunnel, similar to a VPN tunnel.

For example, mobile device 1305 exchanges packets with mesh AP 1308 and/or MMM 1306 using L2 routing, where mobile device 1305, mesh AP 1308, and/or MMM 1306 may operate in a WDS mode to enable the L2 routing while preserving the MAC address of an end-user client device coupled to mobile device 1305. That is, a wireless connection between mobile device 1305 and mesh AP 1308/MMM 1306 is established using MAC addresses of mobile device 1305, mesh AP 1308, and/or MMM 1306.

In one embodiment, when an L2 packet is received by MMM 1306 from mobile device 1305 via mesh AP 1308, MMM 1306 generates an L3 packet as an IP packet by encapsulating the L2 packet, using the IP address of MMM 1306 as a source IP address and using the IP address of MMS 1301 as a destination IP address. The IP packet is then transmitted by MMM 1306 via an L3 tunnel to MMS 1301. Once the MMS 1301 receives the IP packet, MMS 1301 strips off the L3 header (e.g., IP header) to reveal the original L2 packet and transmits the original L2 packet to external network 101.

Similarly, when an Ethernet packet is received from external network 101, MMS 1301 generates an IP packet by encapsulating the Ethernet packet, using the IP address of MMS as a source IP address and using the IP address of MMM 1306 as a destination IP address. The IP packet is then transmitted from MMS 1301 to MMM 1306 via the L3 tunnel. MMM 1306 then strips off the L3 header to reveal the original Ethernet packet and sends the Ethernet packet back to mobile device 1305. Note that MMS 1301 includes a bridge function having learning capability. When a packet is received from MMM 1306 and transmitted to external network 101, the bridge function of MMS 1301 records that particular session is from MMM 1306. Subsequently, when a packet of the same session is received from external network 101, MMS 1301 knows that the packet should be routed to MMM 1306.

Since the L3 tunnel is established between MMM 1306 and MMS 1301 with fixed IP addresses between them while mobile device 1305 communicates with MMM 1306 via L2 routing, when mobile device 1305 roams from one mesh AP to another or from one mesh cell to another, mobile device 1305 does not need to obtain a locally assigned IP address in order to communicate with MMS 1301 at layer 3. As a result, the time required to obtain an IP address can be greatly eliminated and the roaming speed can be greatly improved.

FIG. 17 is a block diagram illustrating software architecture of a mobile mesh manager according to one embodiment of the invention. Note that any of the mesh APs in a mesh cell can be configured as an MMM. For example, MMM 1700 can be any of the mesh APs described above, which may be implemented as part of those as shown in FIG. 3 and/or FIG. 11. Referring to FIG. 17, MMM 1700 includes processing logic 1703 and bridge unit 1704 for processing packets exchanged between uplink interface 1701 and downlink interface 1702. Further, for each of the mesh APs 1708-1710, a virtual device (e.g., virtual devices 1705-1707) is registered with L2 stack to take advantage of the learning capability of the bridge 1704.

According to one embodiment, when an L2 packet is received from a mesh AP such as mesh AP 1708, the packet is received by bridge 1704 via the corresponding virtual device 1705. In addition, a predetermined virtual local area network (VLAN) ID is attached to the packet by the software driver associated with the virtual device 1705. The bridge 1704 also learns or records that this session is associated with virtual device 1705 (e.g., in a mapping table within the bridge function). Bridge may perform any L2 related operations on the packet and pass up the packet to the processing logic 1703. Processing logic 1703 examines the packet to determine whether the packet contains the predetermined VLAN ID, as the packet may belong to another type of packets.

If the packet contains the predetermined VLAN ID, it means the packet is the mobile packet coming from one of the mesh APs. In this situation, processing logic 1703 generates an IP packet by encapsulating the payload of the packet, using an IP address of MMM 1700 as a source IP address and an IP address of MMS 1711 as a destination IP address. The IP packet is then transmitted by processing logic 1703 to MMS 1711 via uplink interface 1701.

Similarly, when a packet is received from MMS 1711 via an L3 tunnel, processing logic 1703 examines the packet to determine whether the packet includes a predetermined IP port and optional predetermined VLAN ID, which was agreed upon between MMM 1700 and MMS 1711. If so, processing logic 1703 strips off the L3 header to reveal the L2 packet encapsulated therein. The L2 packet is then transmitted by bridge 1704 to a proper virtual device, which is then routed to a proper MMM via L2 routing.

Processing logic 1703 may also include a standard layer-3 stack to handle any standard layer-3 processes. Similarly, bridge 1704 may include a standard layer-2 stack for handling any standard layer-2 processes. A bridge is a device that allows wired LANs to interconnect with other wired LANs. Bridges work at OSI model layer 2 and forward data depending upon destination MAC address. Only data with valid destination MAC address are sent across the bridge.

Figure 18A:
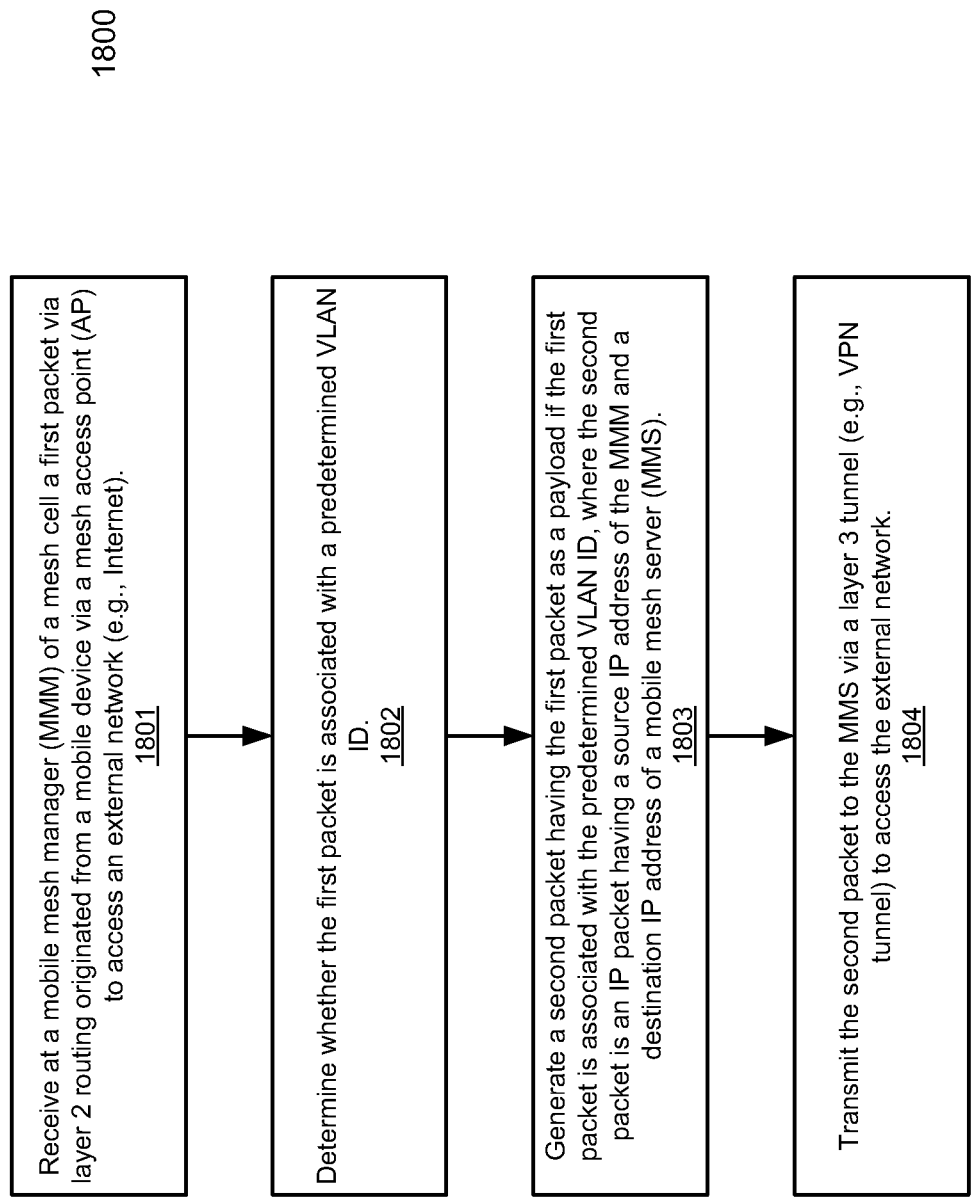
FIGS. 18A and 18B are flow diagrams illustrating a method performed by a mobile mesh manager according to some embodiments of the invention.

FIG. 18A is a flow diagram illustrating a method performed by a mobile mesh manager according to one embodiment of the invention. For example, method 1800 may be performed by MMM 1700 of FIG. 17. Referring to FIG. 18A, at block 1801, an MMM of a mesh cell receives a first packet via layer-2 routing originated from a mobile device, optionally via a mesh AP, to access an external network such as the Internet. The first packet may be received over a wireless connection that has been set up based on the MAC address of the mobile device and the MAC address of the MMM. In response to the first packet, at block 1802, the MMM determines whether the first packet is associated with a predetermined VLAN ID, which may be assigned by a software driver associated with a virtual network interface that receives the first packet.

Note that the MMM may receive many other types of packets from many devices. When a packet is received from a particular mobile device at a virtual device that is communicating with the mobile device over a wireless connection, the virtual device attaches the predetermined VLAN ID to the packet as a signature indicating that the packet is a mobile packet for the mesh net work, in order to distinguish other packets of other types of communications. Thus, when the packet with the attached VLAN ID travels through the network processing stack (e.g., layer-2 stack, etc.), the packet can be "picked" up by the appropriate processing layer. In this example, as described above, there may be an additional layer (e.g., processing logic 1703 of FIG. 17), referred to herein as layer 2.5, which positions between the traditional layer 2 and layer 3. When the packet is received at this layer, the packet is examined whether the packet contains the predetermined VLAN ID. If not, the packet will be passed up to the traditional layer 3 without special processing.

If the packet includes the predetermined VLAN ID, at block 1803, processing logic generates a second packet (e.g., IP packet) having the first packet as a payload. The second packet includes a source IP address of the MMM and a destination IP address of an MMS that interfaces the MMM with the external network. At block 1804, the second packet is transmitted from the MMM to the MMS via a layer-3 tunnel to access the external network.

Figure 18B:
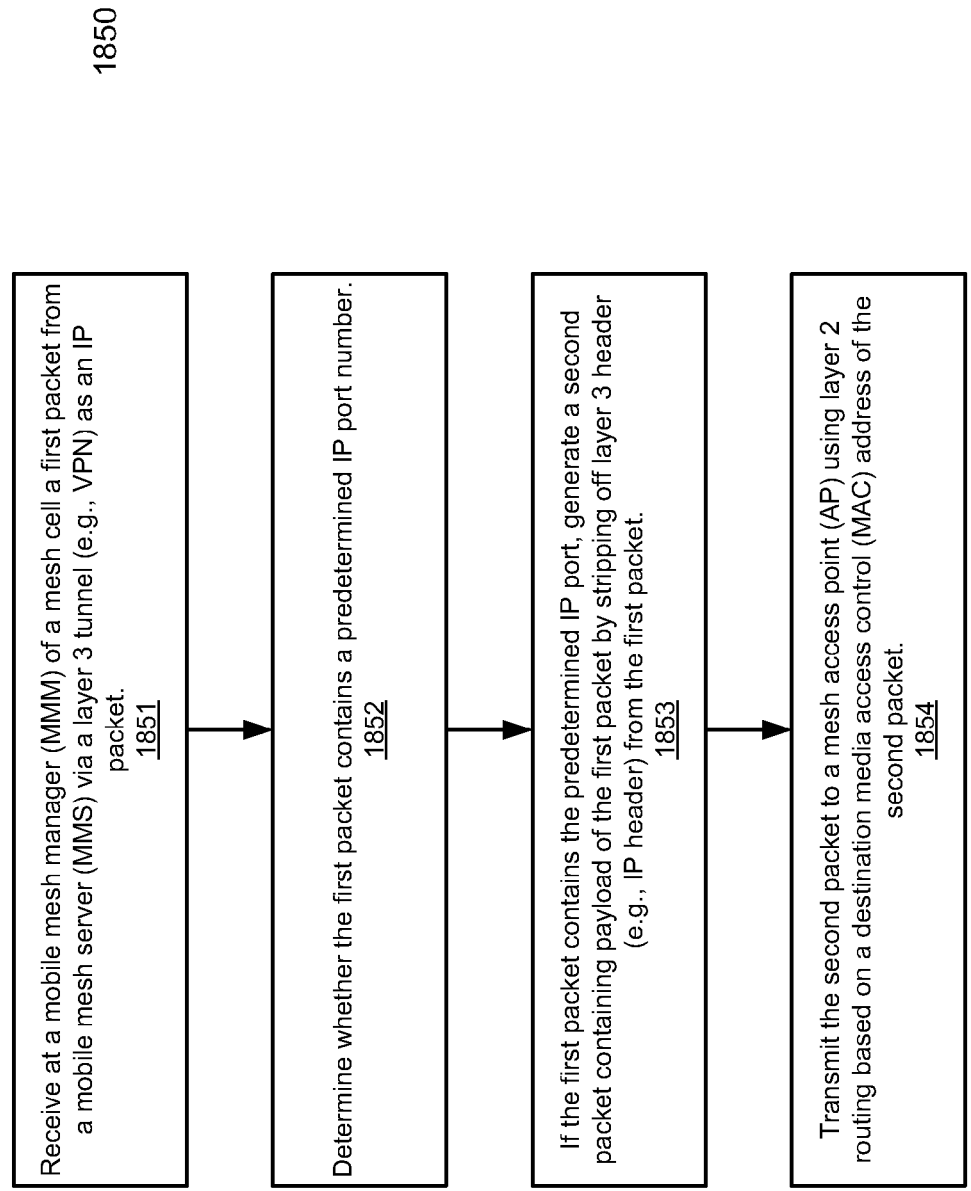

FIG. 18B is a flow diagram illustrating a method performed by a mobile mesh manager according to another embodiment of the invention. For example, method 1850 may be performed by MMM 1700 of FIG. 17. Referring to FIG. 18B, at block 1851, an MMM receives a first packet from an MMS via a layer-3 tunnel as an IP packet. At block 1852, the MMM determines whether the first packet includes an IP port that matches a predetermined IP port. As described above, an MMM may receives many types of IP packets. For example, an IP packet having an IP port number of 80 is processed as a hypertext markup language (HTML) packet by an appropriate processing logic. Similarly, for mobile mesh packets, they are configured with a predetermined IP port number to distinguish themselves from other types of IP packets. Here, if the first packet contains the predetermined IP port number, the first packet is a mobile mesh packet and at block 1583, the MMM generates a second packet containing at least the payload of the first packet by stripping off the layer-3 header (e.g., IP header) of the first packet. At block 1584, the second packet is transmitted from the MMM to an appropriate mesh AP (e.g., taking advantage of the learning capability of a bridge component of the MMM), which in turns forward the second packet to the corresponding mobile device.

Figure 19:
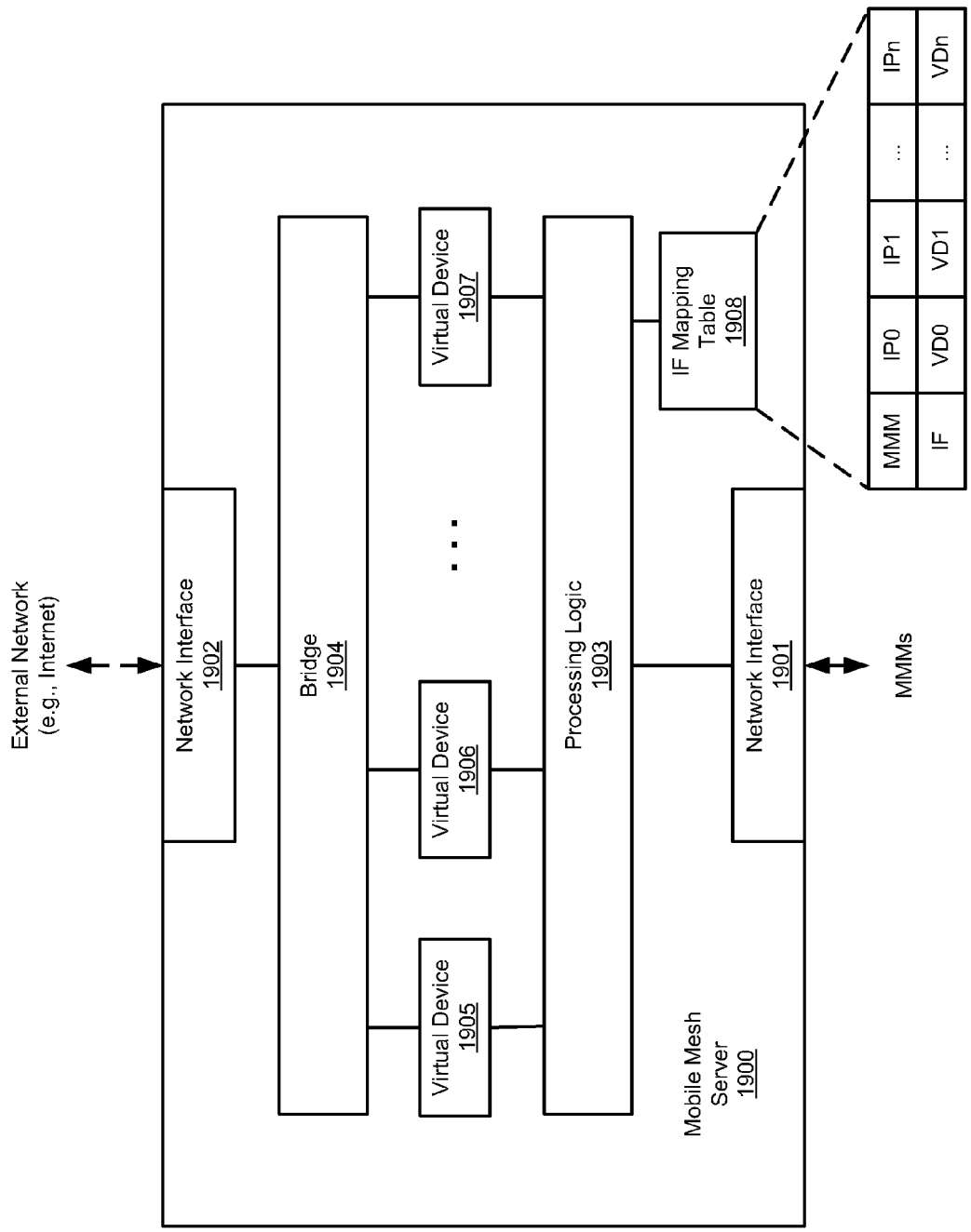
FIG. 19 is a block diagram illustrating a mobile mesh server according to one embodiment of the invention.

FIG. 19 is a block diagram illustrating a mobile mesh server according to one embodiment of the invention. For example, MMS 1900 may be implemented as part of MMS 1301 of FIG. 13. Referring to FIG. 19, MMS 1900 includes, but not limited to, a first network interface 1901 to be coupled to one or more MMMs and a second network interface 1902 to be coupled to an external network such as the Internet. MMS 1900 also includes bridge function 1904 and processing logic 1903. For each of the MMMs that communicate with MMS 1900, a virtual device (e.g., virtual devices 1905-1907) is registered and attached to bridge 1904 to take advantage of the learning capability of bridge 1904 as described above. In addition, processing logic 1903 maintains interface mapping table 1908 for mapping each MMM's IP address with its corresponding virtual device.

According to one embodiment, when an IP packet is received from an MMM over a layer-3 tunnel, processing logic 1903 may receive the packet from a standard layer-3 network stack (not shown) based on the IP port number associated with the packet. As described above, in order to distinguish a mobile packet from other IP packets, the mobile packet is associated with a predetermined IP port number. The standard layer-3 network stack may examines the IP port number and if the IP port number of the packet matches the predetermined IP port number, the packet is forwarded to processing logic 1903.

In response to the packet, according to one embodiment, processing logic 1903 strips off the layer-3 header to reveal the payload, which is the Ethernet packet originated from end-user equipment coupled to a mobile device in the mesh network. Processing logic 1903 further looks up in the interface mapping table 1908 based on the IP address of the MMM (e.g., source IP address of the IP packet) to determine which virtual device to which the Ethernet packet should be forwarded and forwards the Ethernet packet to a proper virtual device. Thereafter, bridge 1904 transmits the Ethernet packet to the external network via network interface 1902. In this embodiment, MMS 1900 presents layer-2 packets, which are received over a layer-tunnel via network interface 1901, to network interface 1902, which may make those mobile devices like having a local connection to connect to the external network. That is, network interface 1902 is considered as a virtual Ethernet network, where routers of external network treat packets as if they were all in local direct wire connections. In addition, bridge 1904 further records which of the virtual devices from which the Ethernet packet is received.

When an incoming Ethernet packet is received from the external network via network interface 1902, bridge 1904 forwards the Ethernet packet to a proper virtual device based on the information captured by its learning functionality. Based on the virtual device that receives the packet, processing logic 1903 looks up the interface mapping table 1908 to determine which of the MMMs to which the packet should be delivered and obtains the MMM's IP address. Processing logic 1903 then generates an IP packet by encapsulating the Ethernet packet as a payload, where the MMM's IP address is the destination IP address and the IP address of MMS 1900 is the source IP address of the IP packet. Thereafter, the IP packet is transmitted to the corresponding MMM over a layer-3 tunnel via network interface 1901. In one embodiment, network interface 1901 operates in a client mode while network interface 1902 operates in a promiscuous mode.

In computing, promiscuous mode or promisc mode is a configuration of a network card that makes the card pass all traffic it receives to the kernel rather than just frames addressed to it—a feature normally used for packet sniffing, and bridged networking for hardware virtualization. Each frame includes the hardware MAC address. When a network card receives a frame, it normally drops it unless the frame is addressed to that network card. In promiscuous mode, however, the network card allows all frames through, thus allowing the computer to read frame intended for other machines or network devices. Promiscuous mode can be used by transparent network bridges in order to capture all traffic that needs to pass the bridge so that it can be retransmitted on the other side of the bridge.

Note that each of the virtual devices 1905-1907 may communicate with a different MMM of a different mesh cell. For example, during a roaming handoff process, virtual device 1905 may be communicate with a first MMM of a first mesh cell over a first layer-3 tunnel, where the first MMM has established a first wireless connection with a mobile device. When the mobile device roams from the first mesh cell to a second mesh cell, the mobile device may establish a second wireless connection with a second MMM of a second mesh cell, which has a second layer-3 tunnel established with virtual device 1906, while the first wireless connection is concurrently maintained. Thus, new packets will be exchanged via the second wireless connection and the second layer-3 tunnel, while packets of an existing session are still exchanged via the first wireless connection and the first layer-3 tunnel. As a result, there is no connection and packets lost with the MMS 1900 (and the external network) during the roaming of the mobile device.

Figure 20A:
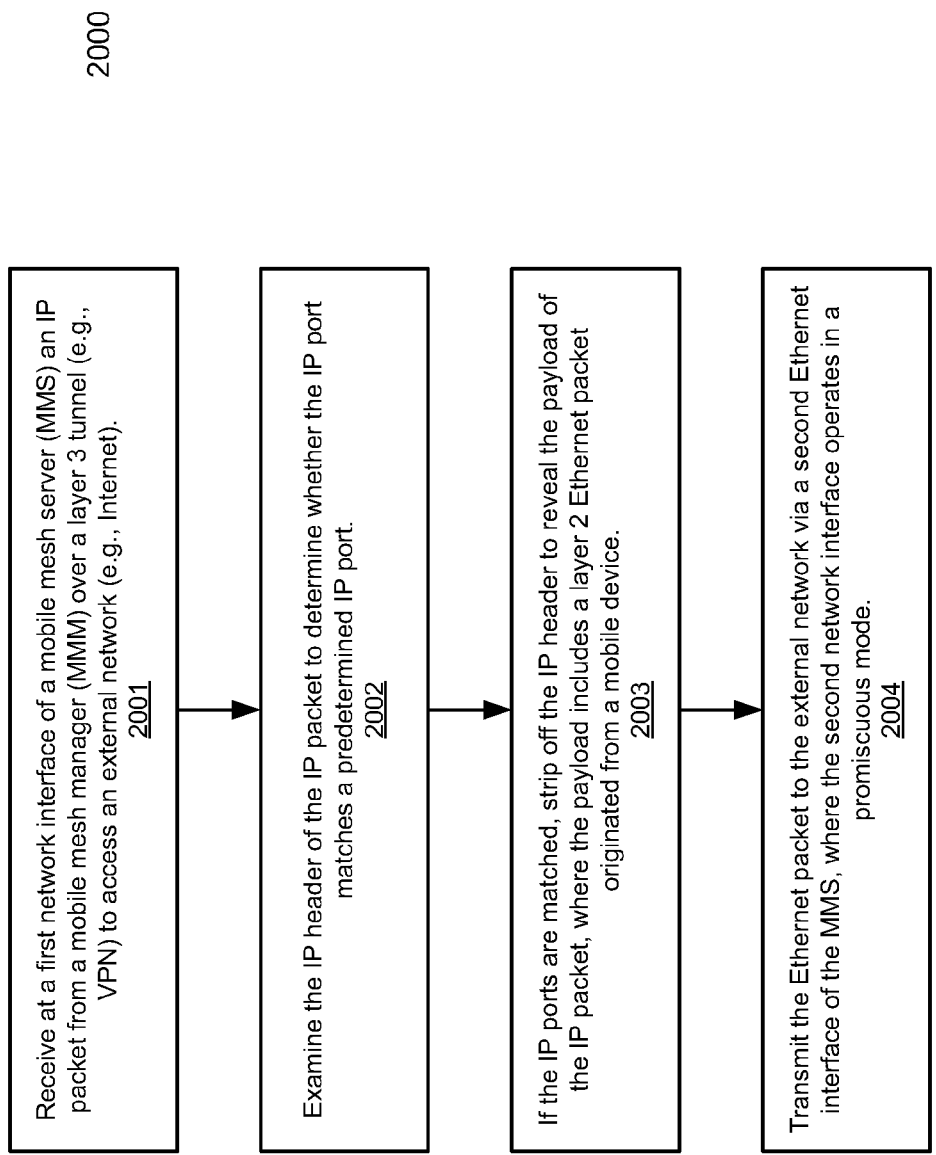
FIGS. 20A and 20B are flow diagrams illustrating a method performed by a mobile mesh server according to some embodiments of the invention.

FIG. 20A is a flow diagram illustrating a method performed by a mobile mesh server according to one embodiment of the invention. For example, method 2000 may be performed by MMS 1900 of FIG. 19. Referring to FIG. 20A, at block 2001, the MMS receives a first packet from an MMM via a first network interface of the MMS over a layer-3 tunnel (e.g., VPN tunnel) to access an external network (e.g., Internet). At block 2002, MMS examines the IP port number of the first packet to determine whether the IP port number matches a predetermined IP port number. If so, at block 2003, the MMS strips off the layer-3 header from the first packet to reveal the payload, which is a layer-2 Ethernet packet originated from a mobile device. Thereafter, at block 2004, based on the MMM's IP address by looking up in the interface mapping table, the Ethernet packet is transmitted to a proper virtual device, which is turn transmitted by the bridge to the external network via a second interface, which operates in a promiscuous mode.

Figure 20B:
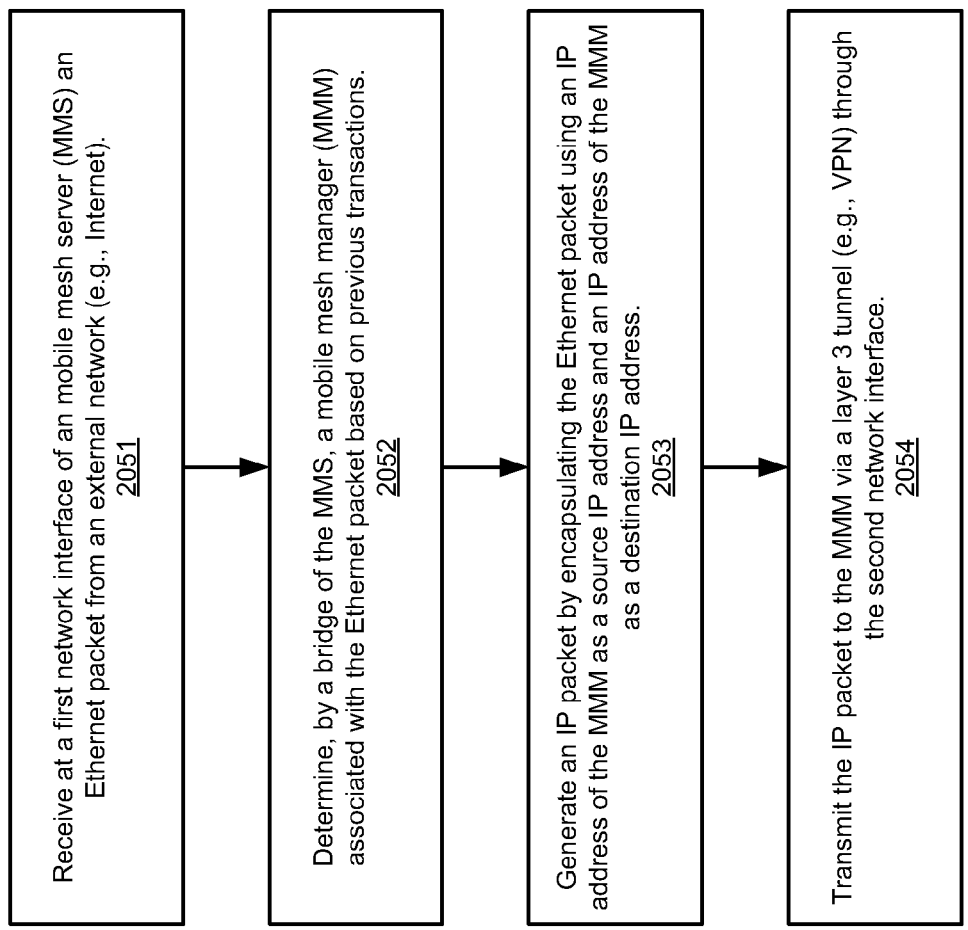

FIG. 20B is a flow diagram illustrating a method performed by a mobile mesh server according to another embodiment of the invention. For example, method 2050 may be performed by MMS 1900 of FIG. 19. Referring to FIG. 20B, at block 2051, an Ethernet packet is received at a first network interface of an MMS from an external network (e.g., Internet). At block 2502, a bridge function of the MMS examines the packet to determine a MMM that is associated with the packet, for example, based on previous transactions that were captured by the learning capability of the bridge. At block 2053, an IP packet is generated by encapsulating the Ethernet packet using an IP address of the MMS as a source IP address and an IP address of the determined MMM as a destination IP address. Thereafter, the IP packet is transmitted to the MMM via a second network interface of the MMS over a layer-3 tunnel.

Example of Data Processing System

Figure 21:
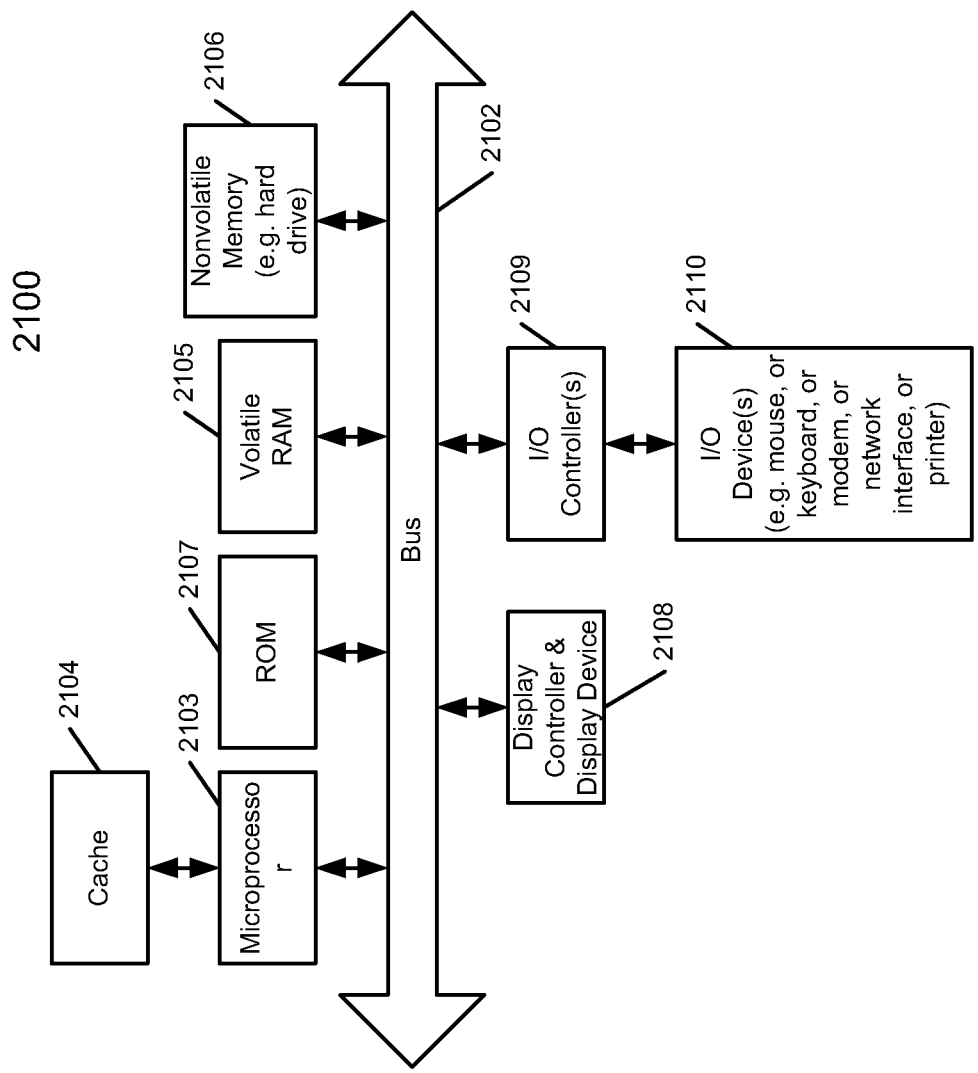
FIG. 21 illustrates a diagrammatic representation of a machine in the exemplary form of a computer system.

FIG. 21 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The system 2100 may be used as a client, a server, a gateway device, or a wireless mesh access point described above. For example, system 2100 may be implemented as part of any of gateway 102, clients 107-114, or APs 103-106 of FIG. 1 or alternatively, management system 309 of FIG. 3. System 2100 may also be implemented as part of any AP described above.

As shown in FIG. 21, the system 2100, which is a form of a data processing system, includes a bus or interconnect 2102 which is coupled to one or more microprocessors 2103 and a ROM 2107, a volatile RAM 2105, and a non-volatile memory 2106. The microprocessor 2103 is coupled to cache memory 2104 as shown in the example of FIG. 13. Processor 2103 may be, for example, a PowerPC microprocessor or an Intel compatible processor. Alternatively, processor 2103 may be a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used.

The bus 2102 interconnects these various components together and also interconnects these components 2103, 2107, 2105, and 2106 to a display controller and display device 2108, as well as to input/output (I/O) devices 2110, which may be mice, keyboards, modems, network interfaces, printers, and other devices which are well-known in the art.

Typically, the input/output devices 2110 are coupled to the system through input/output controllers 2109. The volatile RAM 2105 is typically implemented as dynamic RAM (DRAM) which requires power continuously in order to refresh or maintain the data in the memory. The non-volatile memory 2106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 13 shows that the non-volatile memory is a local device coupled directly to the rest of the components in the data processing system, embodiments of the present invention may utilize a non-volatile memory which is remote from the system; such as, a network storage device which is coupled to the data processing system through a network interface such as a modem or Ethernet interface. The bus 2102 may include one or more buses connected to each other through various bridges, controllers, and/or adapters, as is well-known in the art. In one embodiment, the I/O controller 2109 includes a USB (Universal Serial Bus) adapter for controlling USB peripherals. Alternatively, I/O controller 2109 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a mobile device in a wireless mesh network, the method comprising:
communicating with a first mesh access point (AP) via a first radio frequency (RF) interface of the mobile device over a first wireless connection, the first mesh AP being one of a plurality of mesh APs of a first mesh cell of the wireless mesh network; wherein the first RF interface is associated with a first media control access (MAC) address, and the first wireless connection is established based on the first MAC address;
detecting that signal quality of the first wireless connection drops below a predetermined threshold as the mobile device moves from the first mesh cell towards a second mesh cell;
in response to the detection, establishing via a second RF interface of the mobile device a second wireless connection with a second mesh AP of a second mesh cell of the wireless mesh network, while concurrently maintaining the first wireless connection with the first mesh AP via the first RF interface, such that the mobile device maintains communications with the wireless mesh network via at least one of the first and second wireless connections while roaming from the first mesh cell to the second mesh cell, wherein the second RF interface is associated with a second MAC address that is different than the first MAC address, and the second wireless connection is established based on the second MAC address;
upon successfully establishing the second wireless network, switching network traffic between the mobile device and the wireless mesh network from the first wireless connection to the second wireless connection, wherein packets exchanged over the first wireless connection and the second wireless connection are originated from an end-user device coupled to a network port of the mobile device, and wherein the mobile device operates in a wireless distribution system (WDS) mode in which packets associated with the end-user device are passed through the mobile device using layer-2 routing while preserving a MAC address of the end-user device; and
terminating the first wireless connection once the network traffic has been switched over to the second wireless connection.

2. A mobile device, comprising:
a processor;
a first radio frequency (RF) interface card having a first network address to communicate with a mesh access point (AP) of a first mesh cell over a first wireless connection that has been established based on the first network address, the first mesh AP being one of a plurality of mesh APs in the first mesh cell of a wireless mesh network; wherein the first network address is a first media access (MAC) address, and the first wireless connection is established based on the first MAC address;
a second RF interface card having a second network address, wherein the second network address is a second MAC address that is different than the first MAC address,
wherein the processor is configured to detect that signal quality of the first wireless connection drops below a predetermined threshold as the mobile device moves from the first mesh cell towards to a second mesh cell of the wireless mesh network,
wherein in response to the detection, the processor is configured to establish a second wireless connection based on the second MAC address with a second mesh AP of the second mesh cell via the second RF interface card based on the second network address, while concurrently maintaining the first wireless connection with the first mesh AP via the first RF interface card, the second mesh AP being one of a plurality of mesh APs in the second mesh cell, such that the mobile device maintains communications with the wireless mesh network via at least one of the first and second wireless connections while roaming from the first mesh cell to the second mesh cell; and
a network port to be coupled to an end-user device, wherein packets exchanged over the first wireless connection and the second wireless connection are originated from the end-user device, and wherein the mobile device operates in a wireless distribution system (WDS) mode in which packets associated with the end-user device are passed through the mobile device using layer-2 routing while preserving a MAC address of the end-user device.

3. A method performed by a mesh access point (AP) of a wireless mesh network, comprising:
receive a first packet originated from a mobile device via a downlink interface of the mesh AP, the first packet being destined to a destination node of an external network, which is communicatively coupled to the wireless mesh network via a mobile mesh server (MMS), wherein the first packet is received via layer-2 routing from the mobile device based on a media access control (MAC) address of the mobile device and a MAC address of the mesh AP;
examining the first packet to determine whether the packet contains a predetermined virtual local area network (VLAN) ID;
generating within the mesh AP a second packet by encapsulating the first packet as a payload of the second packet if the first packet contains the predetermined VLAN ID, wherein the second packet includes an IP address of the mesh AP as a source IP address and an IP address of the MMS as a destination IP address;
transmitting the second packet from the mesh AP to the MMS over a layer-3 tunnel that has been established based on the IP address of the mesh AP and the IP address of the MMS, in order to access the destination node of the external network, wherein when the MMS receives the second packet, the MMS is configured to strip off a layer-3 header from the second packet to reveal the first packet as part of the payload and to route the first packet to the external network;
configuring the mesh AP selected from a plurality of mesh APs that form a mesh cell as a mobile mesh manager (MMM), wherein all traffic from the rest of the mesh APs are routed by the MMM to the MMS, or vice versa;
constantly maintaining the layer-3 tunnel between the MMM and the MMS based on the IP address of the MMM and the MMS, such that the mobile device does not have to obtain a local IP address in order to access the MMS while roaming from one of the mesh APs to another one of the mesh AP within the mesh cell;
receiving, at the mesh AP, a third packet from the MMS over the layer-3 tunnel, wherein the third packet includes the IP address of the MMS as a source IP address, and wherein the third packet includes the IP address of the mesh AP as a destination IP address;
examining the third packet to determine whether the third packet includes a predetermined IP port number;
stripping off a layer-3 header from the third packet to reveal a payload of the third packet if the third packet contains the predetermined IP port number; and
transmitting a fourth packet containing the payload of the third packet to the mobile device using layer-2 routing based on the MAC address of the mesh AP and the MAC address of the mobile device.

4. The method of claim 3, wherein the MMS is communicatively coupled to a plurality of MMMs, each corresponding to a particular mesh cell, and wherein the MMS is configured to communicate with each of the MMMs over a different layer-3 tunnel, respectively.

5. A wireless mesh network system, comprising:
a mobile mesh server (MMS) having a first Ethernet interface and a second Ethernet interface, the first Ethernet interface to be coupled to the Internet;
a first mesh cell communicatively coupled to the second Ethernet interface of the MMS over a first layer-3 tunnel, the first mesh cell having a plurality of first mesh access points (APs) and a first mobile mesh manager (MMM) managing the first mesh APs, wherein in response to packets received from at least one of the first mesh APs, the first MMM is configured to transmit the packets via the first layer-3 tunnel to the MMS which routes the packets to the Internet;
a second mesh cell communicatively coupled to the second Ethernet interface of the MMS over a second layer-3 tunnel, the second mesh cell having a plurality of second mesh APs and a second MMM managing the second mesh APs, wherein in response to packets received from at least one of the second mesh APs, the second MMM is configured to transmit the packets via the second layer-3 tunnel to the MMS which routes the packets to the Internet; and
a mobile device having a first radio frequency (RF) interface card having a first media access control (MAC) address and a second RF interface card having a second MAC address that is different than the first MAC address, the mobile device being communicatively coupled to the first mesh cell via at least one of the first mesh APs over a first wireless connection established via the first RF interface card based on the first MAC address,
wherein when the mobile device detects that signal quality of the first wireless connection drops below a predetermined threshold as the mobile device roams from the first mesh cell to the second mesh cell, the mobile device is configured to establish, via the second RF interface card, a second wireless connection with at least one of the second mesh APs based on the second MAC address, while currently maintaining the first wireless connection via the first RF interface card, such that the mobile device maintains,
wherein the mobile device transmits a first packet to the first MMM using layer-2 routing via the first wireless connection, wherein the first MMM generates a second packet by encapsulating the first packet as a payload, using an IP address of the first MMM as a source IP address, and using an IP address of the MMS as a destination IP address, and wherein the first MMM transmits the second packet to the MMS via the first layer-3 tunnel,
wherein the mobile device transmits a third packet to the second MMM using layer-2 routing via the second wireless connection, wherein the second MMM generates a fourth packet by encapsulating the third packet as a payload, using an IP address of the second MMM as a source IP address, and using an IP address of the MMS as a destination IP address, and wherein the second MMM transmits the fourth packet to the MMS via the second layer-3 tunnel, and
wherein in response to the second packet received from the first MMM, the MMS strips off a layer-3 header of the second packet to reveal the first packet and transmits the first packet to a destination node of the Internet, and wherein in response to a fifth packet received from destination node of the Internet responding to the first packet, the MMS generates a sixth packet as an IP packet by encapsulating the fifth packet and transmits the sixth packet to the first MMM via the first layer-3 tunnel, which recovers the fifth packet from the sixth packet and forwards the fifth packet to the mobile device using layer-2 routing.

6. The system of claim 5, wherein in response to the fourth packet received from the second MMM, the MMS strips off a layer-3 header of the fourth packet to reveal the third packet and transmits the third packet to the destination node of the Internet, and wherein in response to a seventh packet received from destination node of the Internet responding to the third packet, the MMS generates an eighth packet as an IP packet by encapsulating the seventh packet and transmits the eighth packet to the second MMM via the second layer-3 tunnel, which recovers the seventh packet from the eighth packet and forwards the seventh packet to the mobile device using layer-2 routing.

7. The method of claim 1, wherein the mobile device communicates with the first and second mesh APs using an IEEE 801.11 compatible protocol.

8. The method of claim 1, wherein the first mesh cell includes a first mobile mesh manager (MMM) for managing a plurality of APs associated with the first mesh cell, and wherein the second mesh cell includes a second MMM for managing a plurality of APs associated with the second mesh cell.

9. The method of claim 8, wherein any one of the plurality of APs of the first mesh cell can be configured as an MMM for the first mesh cell, and wherein any one of the plurality of APs of the second mesh cell can be configured as an MMM for the second mesh cell.

10. The method of claim 8, wherein the first MMM and the second MMM are managed by a mobile mesh server (MMS).

11. The method of claim 10, wherein each of the first MMM and second MMM communicates with the MMS via a respective virtual private network (VPN).

12. The method of claim 10, wherein the MMS operates as a gateway device to a wide area network (WAN).

13. The mobile device of claim 2, wherein the mobile device communicates with the first and second mesh APs using an IEEE 801.11 compatible protocol.

14. The mobile device of claim 2, wherein the first mesh cell includes a first mobile mesh manager (MMM) for managing a plurality of APs associated with the first mesh cell, and wherein the second mesh cell includes a second MMM for managing a plurality of APs associated with the second mesh cell.

15. The mobile device of claim 14, wherein any one of the plurality of APs of the first mesh cell can be configured as an MMM for the first mesh cell, and wherein any one of the plurality of APs of the second mesh cell can be configured as an MMM for the second mesh cell.

16. The mobile device of claim 14, wherein the first MMM and the second MMM are managed by a mobile mesh server (MMS).

17. The mobile device of claim 16, wherein each of the first MMM and second MMM communicates with the MMS via a respective virtual private network (VPN).

18. The mobile device of claim 16, wherein the MMS operates as a gateway device to a wide area network (WAN).

* * * * *